US011361337B2

(12) United States Patent
Gupta et al.

(10) Patent No.: US 11,361,337 B2
(45) Date of Patent: Jun. 14, 2022

(54) INTELLIGENT CASE MANAGEMENT PLATFORM

(71) Applicant: Accenture Global Solutions Limited, Dublin (IE)

(72) Inventors: Anshul Gupta, Ghaziabad (IN); Annie Thomas, Chennai (IN); Subhajit Ghosh, West Bangal (IN)

(73) Assignee: Accenture Global Solutions Limited, Dublin (IE)

( * ) Notice: Subject to any disclaimer, the term of this patent is extended or adjusted under 35 U.S.C. 154(b) by 104 days.

(21) Appl. No.: 16/107,520

(22) Filed: Aug. 21, 2018

(65) Prior Publication Data
US 2020/0065848 A1 Feb. 27, 2020

(51) Int. Cl.
*G06Q 30/02* (2012.01)
*G06N 5/02* (2006.01)

(52) U.S. Cl.
CPC ........... *G06Q 30/0233* (2013.01); *G06N 5/02* (2013.01); *G06Q 30/0224* (2013.01)

(58) Field of Classification Search
CPC .. G06Q 30/0233; G06Q 30/0224; G06N 5/02; G06N 3/08
See application file for complete search history.

(56) References Cited

U.S. PATENT DOCUMENTS

| | | | |
|---|---|---|---|
| 7,116,682 B1 * | 10/2006 | Waclawsky | H04L 47/824 370/468 |
| RE42,663 E | 8/2011 | Lazarus et al. | |
| 8,355,945 B1 * | 1/2013 | Lall | G06Q 40/00 705/7.29 |
| 9,020,920 B1 * | 4/2015 | Haggerty | G06Q 10/06315 707/705 |
| 9,129,290 B2 * | 9/2015 | Kannan | G06N 7/005 |
| 10,438,212 B1 * | 10/2019 | Jilani | G06Q 30/0281 |

(Continued)

FOREIGN PATENT DOCUMENTS

WO 2017019078 A1 2/2017

OTHER PUBLICATIONS

Kreato Software Inc., "Email Intelligence", http://www.kreatocrm.com/conversation-intelligence/, Mar. 25, 2018, 5 pages.

(Continued)

*Primary Examiner* — Yehdega Retta
(74) *Attorney, Agent, or Firm* — Harrity & Harrity, LLP

(57) ABSTRACT

A device may obtain customer data, associated with a customer identifier, that includes an indication of a recency of a past purchase, a frequency of past purchases, and/or a monetary value associated with past purchases by a customer associated with the customer identifier. The device may determine, based on comparing the customer data and aggregate customer data, a first score that predicts a current measure of loyalty associated with the customer, and may predict, based on the first score, a predicted frequency of future purchases by the customer and a predicted monetary value associated with the future purchases, to determine a second score that predicts a future measure of loyalty associated with the customer. The device may compare the first score and the second score to determine a risk level associated with the customer, and may cause an action to be performed based on determining the risk level.

19 Claims, 13 Drawing Sheets

(56) References Cited

U.S. PATENT DOCUMENTS

| | | | | |
|---|---|---|---|---|
| 2001/0054064 A1* | 12/2001 | Kannan | ................ | H04M 3/567 709/203 |
| 2004/0138958 A1 | 7/2004 | Watarai et al. | | |
| 2007/0100680 A1 | 5/2007 | Kumar et al. | | |
| 2009/0319339 A1* | 12/2009 | Singh | .................... | G06Q 10/10 705/7.32 |
| 2010/0100412 A1* | 4/2010 | Cases | .................... | G06Q 10/06 705/7.27 |
| 2010/0293560 A1* | 11/2010 | Bland | .................... | H04L 51/14 719/328 |
| 2010/0332287 A1 | 12/2010 | Gates et al. | | |
| 2013/0282594 A1 | 10/2013 | Gaedcke et al. | | |
| 2014/0304343 A1 | 10/2014 | Skiba et al. | | |
| 2015/0332292 A1* | 11/2015 | Unser | ................... | G06Q 30/02 705/7.31 |
| 2015/0332296 A1* | 11/2015 | Chu | .................. | G06Q 30/0202 705/7.33 |
| 2016/0044173 A1 | 2/2016 | Tuchman et al. | | |
| 2016/0071140 A1 | 3/2016 | Sherman | | |
| 2017/0017968 A1* | 1/2017 | Bhattacharjee | .... | G06Q 30/0201 |
| 2017/0024681 A1 | 1/2017 | Singh et al. | | |
| 2017/0140280 A1 | 5/2017 | Ajmera et al. | | |
| 2018/0191905 A1 | 7/2018 | Mccoy | | |
| 2018/0341869 A1* | 11/2018 | Baughman | ............. | G06N 3/006 |
| 2019/0227822 A1* | 7/2019 | Azmoon | ................ | G06F 40/35 |

OTHER PUBLICATIONS

Kreato Software Inc., "Call Conversation Intelligence", http://www.kreatocrm.com/call-conversation-intelligence/, Jul. 31, 2018, 4 pages.

Eccovia Solutions, Inc., "Case Management Suite", https://eccoviasolutions.com/products-case-management/case-management-suite/, Jul. 12, 2016, 7 pages.

DigitalGenius., "The DigitalGenius AI Platform", https://www.digitalgenius.com/product/, Mar. 2, 2017, 13 pages.

* cited by examiner

202 Recency a. Arrange the unique customer in descending order of recency for min. 1 year b. Take 1/5 of the customer pool; give them the score of 5 c. 80% of the remaining customer pool – take 1/5 of that customer pool, give them a score of 4 d. 80% of the remaining customer pool – take 1/5 of that customer pool, give them a score of 3 e. 80% of the remaining customer pool – take 1/5 of that customer pool, give them a score of 2 f. 80% of the remaining customer pool – take 1/5 of that customer pool, give them a score of 1

204 Frequency a. Set a threshold frequency of the customer stay (e.g., a min of 5 stays, identify what should be the best threshold looking at the data)

b. Take all customers who have stayed for a period of min 1 year and have min number of 5 stays. Arrange in descending order c. Take 1/5 of the customer pool; give them a score of 5 d. 80% of the remaining customer pool – take 1/5 of that customer pool, give them a score of 4 e. 80% of the remaining customer pool – take 1/5 of that customer pool, give them a score of 3 f. 80% of the remaining customer pool – take 1/5 of that customer pool, give them a score of 2 g. 80% of the remaining customer pool – take 1/5 of that customer pool, give them a score of 1

206 Monetary Value a. Arrange the customers in order of average spend- Descending value. Customer who spend max will be on top b. Take 1/5 of the customer pool; give them the score of 5 c. 80% of the remaining customer pool – take 1/5 of that customer pool, give them a score of 4 d. 80% of the remaining customer pool – take 1/5 of that customer pool, give them a score of 3 e. 80% of the remaining customer pool – take 1/5 of that customer pool, give them a score of 2 f. 80% of the remaining customer pool – take 1/5 of that customer pool, give them a score of 1

FIG. 2A

212
RFM Analysis
A. pick all customers who have score of 5 for recency, score 5-4 for Frequency, score 3-5 or monetary value B. People who have highest recency score of 5, top 2 frequency score of 4-5, top 3 monetary value of 3-5 = Give them a score of 5

C. People who have next highest recency score of 4, top 2 frequency score 4-5, top 3 monetary value 3-5 = Give them a score of 4

D. People who have next highest recency score of 3, top 2 frequency score 3-5, top 3 monetary value 2-5 = Give them a score of 3

E. People who have next highest recency score of 2, top 2 frequency score 3-5, top 3 monetary value 2-5 = Give them a score of 2

F. People who have next highest recency score of 1, top 2 frequency score of 1-5, top monetary value 1-5 = Give them a score of 1

G. Plot a scatter graph for each customer
X axis Recency
Y axis Frequency
Size of bubble is average monetary value of the customer Assign:
5 – Highly Loyal
4 – Loyal
3 – Loyalty at Risk
2 – Loyalty Lost
1 – Loyalty Unknown

FIG. 2B

INTELLIGENT CASE MANAGEMENT PLATFORM

BACKGROUND

Customer Relationship Management (CRM) tools and/or platforms may be used to help an organization manage and/or track sales, contacts, customer relations, productivity, and/or the like. Such tools and/or platforms may generate key performance indicators (KPIs) for assessing pipelines and forecasting sales.

SUMMARY

According to some possible implementations, a method may include receiving, by a device, a customer identifier associated with a customer query, and obtaining, by the device, customer data associated with the customer identifier, wherein the customer data includes an indication of a recency of a past purchase by a customer associated with the customer identifier, a frequency of past purchases by the customer, and/or a monetary value associated with the past purchases by the customer. The method may include obtaining, by the device, aggregate customer data associated with a plurality of customer identifiers, wherein the aggregate customer data is associated with aggregate purchases by customers associated with the plurality of customer identifiers. The method may include determining, by the device, a first score for the customer based on comparing the customer data and the aggregate customer data, wherein the first score predicts a current measure of loyalty associated with the customer. The method may include predicting, by the device and using a first model, a predicted frequency of future purchases by the customer and a predicted monetary value associated with the future purchases based on the first score. The method may include determining, by the device, a second score for the customer based on the predicted frequency of future purchases and the predicted monetary value, wherein the second score predicts a future measure of loyalty associated with the customer. The method may include comparing, by the device, the first score and the second score, and determining, by the device, a risk level associated with the customer based on a result of comparing the first score and the second score. The method may include causing, by the device, an action to be performed based on determining the risk level associated with the customer identifier.

According to some possible implementations, a device may include one or more memories, and one or more processors, communicatively coupled to the one or more memories, to receive a customer query, wherein the customer query includes a string of text and a customer identifier. The one or more processors may determine, using a first model, a first score associated with the customer query based on the string of text, wherein the first score predicts a customer sentiment, and wherein the customer sentiment includes a real-time indication of whether the customer sentiment is negative, neutral, or positive. The one or more processors may obtain customer data associated with the customer identifier, and may determine, using a second model, a second score associated with the customer query based on the first score and the customer data, wherein the second score predicts a level of priority associated with the customer query. The one or more processors may obtain agent data associated with a plurality of agents available to assist in resolving the customer query, and may determine, using a third model, a plurality of third scores associated with the plurality of agents based on the second score and the agent data, wherein the plurality of third scores predict levels of confidence that agents, in the plurality of agents, have abilities to resolve customer queries associated with a threshold level of priority. The one or more processors may assign, in real-time, an agent to respond to the customer query based on determining the plurality of third scores.

According to some possible implementations, a non-transitory computer-readable medium may store instructions that include one or more instructions that, when executed by one or more processors of a device, cause the one or more processors to receive a customer identifier associated with a customer query. The one or more instructions may cause the one or more processors to obtain customer data associated with the customer identifier, wherein the customer data includes an indication of a recency of a past purchase by a customer associated with the customer identifier, a frequency of past purchases by the customer, or a monetary value associated with the past purchases by the customer. The one or more instructions may cause the one or more processors to obtain aggregate customer data associated with a plurality of customer identifiers, wherein the aggregate customer data is associated with aggregate purchases by customers associated with the plurality of customer identifiers. The one or more instructions may cause the one or more processors to determine a customer loyalty score for the customer based on comparing the customer data and the aggregate customer data, wherein the customer loyalty score indicates a current measure of loyalty associated with the customer. The one or more instructions may cause the one or more processors to obtain agent data associated with a plurality of agents available to assist in resolving the customer query. The one or more instructions may cause the one or more processors to determine, using a first model, a plurality of first scores associated with the plurality of agents based on the customer loyalty score and the agent data, wherein the plurality of first scores predict abilities of agents, in the plurality of agents, to resolve customer queries associated with a threshold customer loyalty score. The one or more instructions may cause the one or more processors to assign, in real-time, an agent to respond to the customer query, based on determining the plurality of first scores.

BRIEF DESCRIPTION OF THE DRAWINGS

FIGS. 2A-2E are diagrams of an example implementation described herein.

DETAILED DESCRIPTION

Figure 1A:
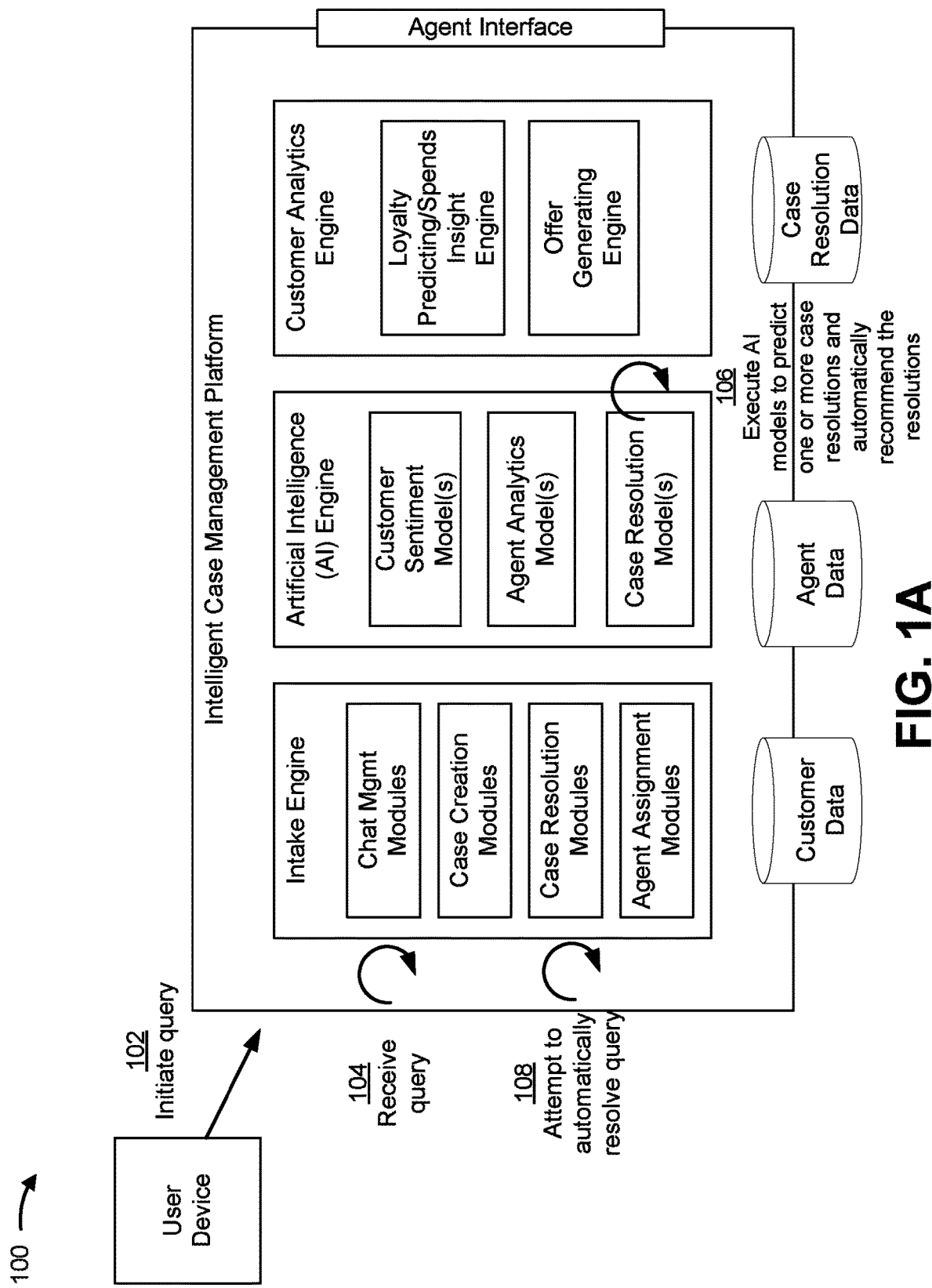
FIGS. 1A-1C are diagrams of an example implementation described herein.

The following detailed description of example implementations refers to the accompanying drawings. The same reference numbers in different drawings may identify the same or similar elements.

Customer retention is extremely important for any business, as it costs approximately five times as much money to attract a new customer versus retaining an existing one, and depending on what industry a business is in, such discrepancy may greatly increase. Moreover, reports indicate that once an existing customer decides to leave a business, approximately two-thirds never return. Existing case management tools, used, for example, by customer service agents to manage customer queries, can maintain customer profile data, but lack actionable insights based on the data. The customer service agents are forced to react, on-the-fly, and attempt to please disgruntled customers by offering "one size fits all" type promotions. Moreover, the assignment of customer service agents to cases (e.g., customer queries), using existing case management tools, is randomized, meaning that inexperienced customer service agents may be assigned cases involving demanding and/or lucrative customers. The inexperienced customer service agents often lack the skillsets necessary to serve the demanding customers and/or overlook opportunities by which the lucrative customers may be enticed to experience more services or products that a business provides. Such lackluster customer service and/or provision of irrelevant offers often leaves customers feeling misunderstood, frustrated, and possibly even offended, to the point that a customer may decide to leave, and pursue business elsewhere.

Some implementations, described herein, provide an intelligent case management platform, by which customer data may be intelligently analyzed for use in predicting whether a customer is at risk of leaving a business. In this way, the customer may be intelligently matched with an agent (e.g., a customer service agent) that may be more adept at solving the customer query, and better equipped, based on past experiences, to positively resolve the customer query posed by the customer. Moreover, the customer data may be intelligently analyzed to predict future spending patterns, by which an agent may gain insight into the customer's preferences and/or behaviors to provide more precisely targeted offers and promotions, which further improves customer retention. In this way, the management of cases may be more automated, efficient, and consistent, thereby conserving network resources (e.g., signaling resources, communication interfaces, bandwidth, and/or the like) that would otherwise be needed to randomly distribute cases to hundreds or thousands of agents.

Furthermore, implementations described herein implement rigorous, computerized processes to perform automation of case resolution, automation of case creation, automation of agent assignment, and/or automation of targeted offer generation to perform aspects of case management that were not previously performed or were previously performed using subjective human intuition or input. In this way, automating aspects of performing intelligent case management conserves computing resources (e.g., processor resources, memory resources, and/or the like) that would otherwise be wasted in attempting to manually and inefficiently complete tasks that are automatable.

Figure 1B:
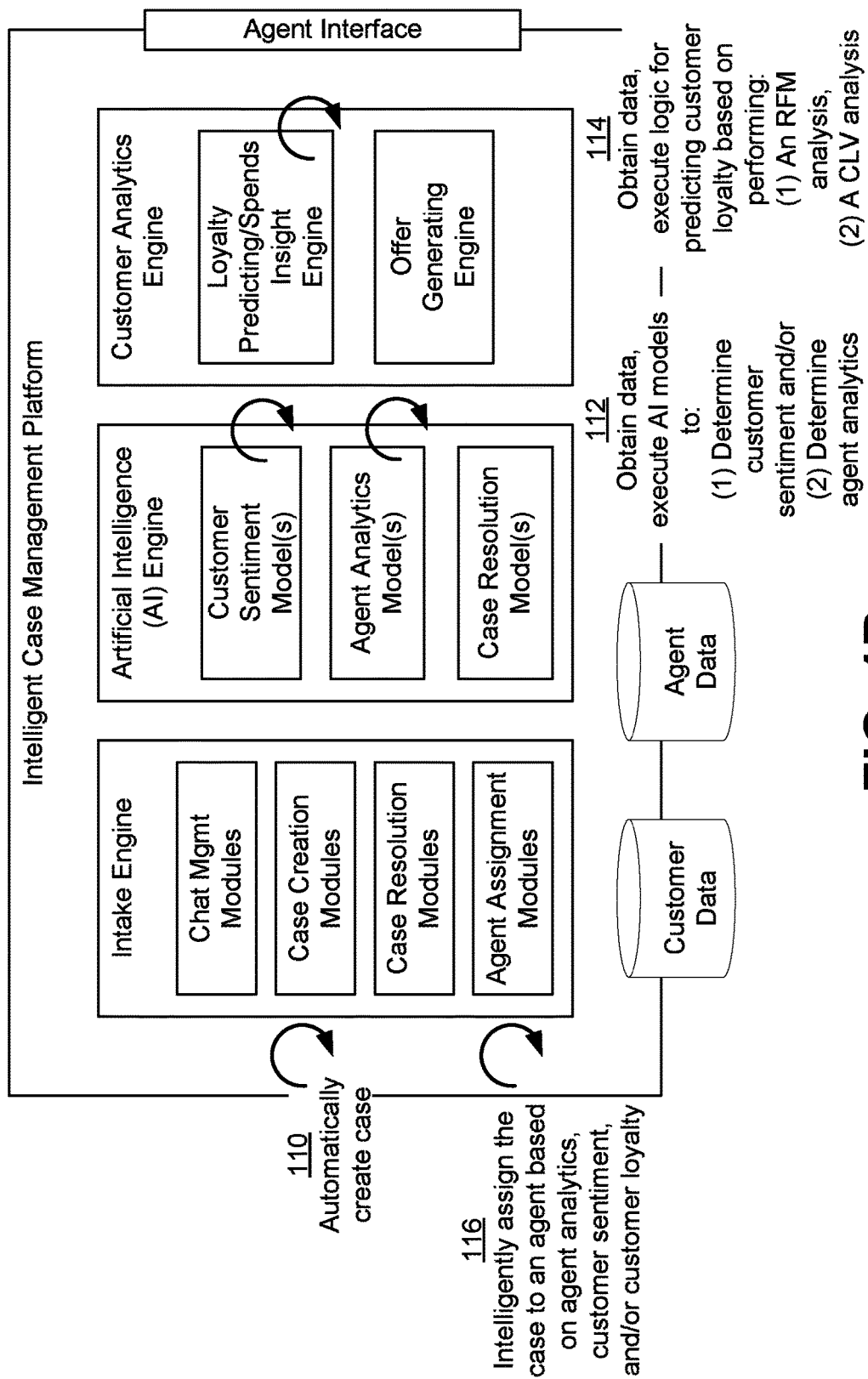
Figure 1C:
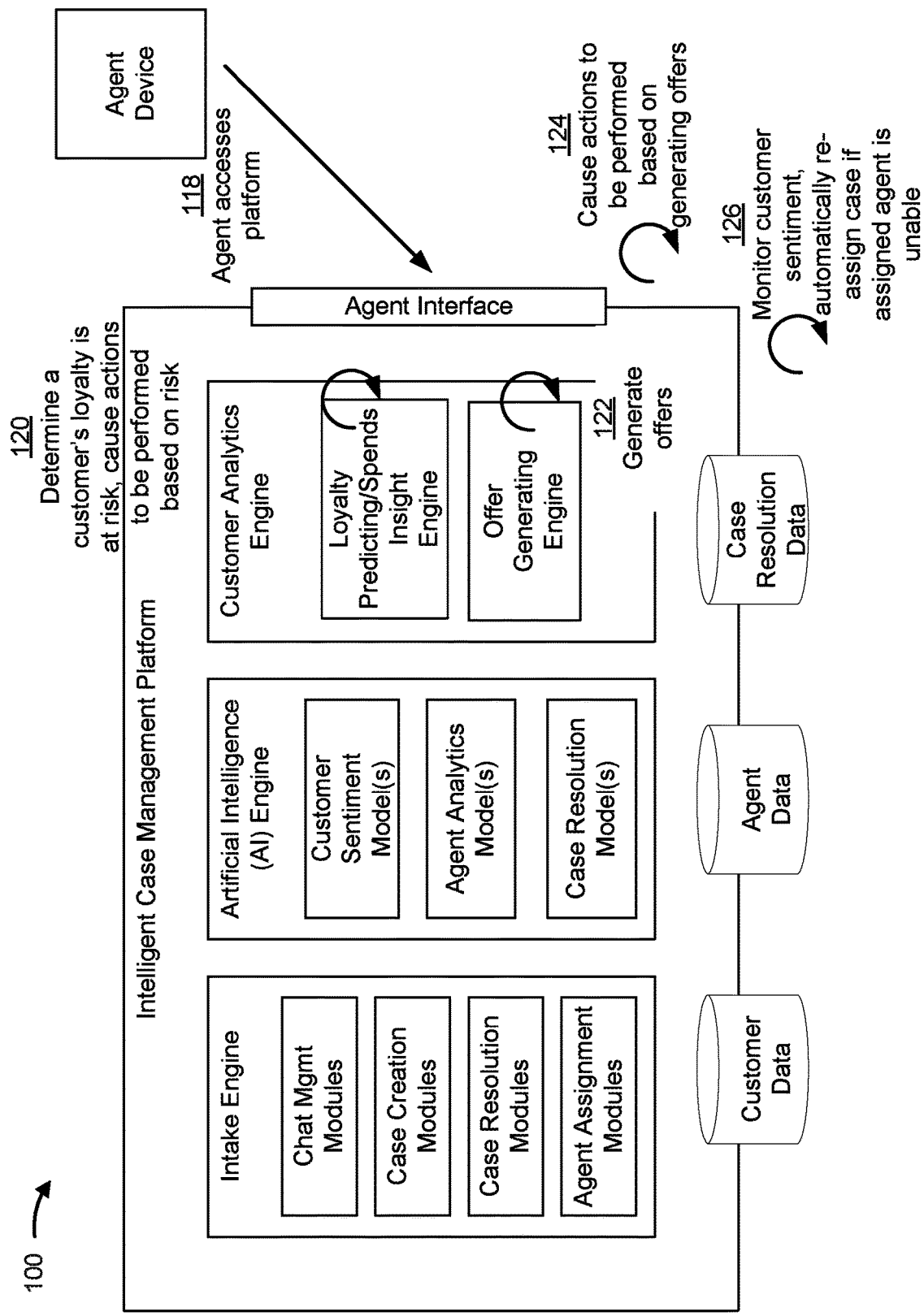

FIGS. 1A-1C are diagrams of an example implementation 100 described herein. As shown in FIGS. 1A-1C, example implementation 100 may include an intelligent case management platform, which interacts with one or more user devices and/or agent devices. The intelligent case management platform may include one or more computing engines, such as an intake engine, an Artificial Intelligence (AI) engine, a customer analytics engine, and/or the like, which may facilitate and/or automate various aspects relating to intelligent case management. For example, the intake engine may be configured to manage customer-agent interactions by way of one or more chat management (Mgmt) modules, automate case creation by way of one or more case creation modules, automatically provide case resolution by way of one or more case resolution modules, and intelligently assign agents to cases by way of one or more agent assignment modules. The one or more AI engines may be configured to intelligently predict customer sentiment, perform agent analytics, and/or intelligently recommend solutions for automated case resolution using one or more models (e.g., AI models, machine learning models, and/or the like). The customer analytics engine may be used to facilitate improved customer service and, ultimately improved customer retention, for example, by predicting customer loyalty scores, predicting future expenditures, providing intelligent insights based on customer spending patterns, and/or generating targeted offers to send to customers. The intelligent case management platform may further include (e.g., store), obtain, and/or access data from multiple data structures, including customer data (e.g., customer profile data, customer purchase data, aggregate customer purchase data, and/or the like), agent data (e.g., agent scores, agent ratings, and/or the like), and/or case resolution data (e.g., past solutions or offers used to resolve current cases, and/or the like) based on historic case resolution.

As shown in FIG. 1A, and by reference number 102, a customer (e.g., a user) may, using a user device, initiate a query for sending to the intelligent case management platform. In some implementations, the customer may be an existing customer of a business (e.g., a hotel business, a travel business, an airline business, a rental car business, a spa business, and/or the like), and initiate a customer query using the user device. In some implementations, the customer query may include a request to create a new reservation, a request to change or modify an existing reservation, a request to make a purchase, a request to express a grievance, a request to update customer data (e.g., update a customer address, etc.), a request to leave feedback, and/or the like. In some implementations, the user device may include a phone, a computer (e.g., a laptop, a tablet, etc.), a smart device (e.g., a smart phone, a smart watch, a smart speaker, etc.), and/or the like, which may provide a user interface by which the customer may initiate the customer query, and cause an intelligent case management process to be initiated. The customer query may be initiated by way of the customer initiating a voice call, initiating a web chat (e.g., by way of an online chat interface), sending an electronic mail (e-mail), using a social media channel (e.g., a Tweet®, etc.), and/or the like.

As further shown in FIG. 1A, and by reference number 104, the intelligent case management platform may receive the customer query, and/or information associated with the customer query. In some implementations, the intelligent case management platform may manage one or more interfaces, by which to obtain the customer query, obtain information associated with the customer query (e.g., an IP address associated with the source of the query, strings of text included in the customer query, and/or the like), and/or electronically respond to the customer query. For example, the intelligent case management platform may support and/or manage one or more communication (e.g., data) interfaces, by which the intelligent case management platform may employ a chatbot for obtaining the customer query and/or initially receiving and/or responding to the customer query. The intelligent case management platform may further include an interface by which to obtain and/or stream data (e.g., text data, voice data, and/or the like) associated with the customer query, for use in performing automated case resolution and/or intelligently assessing a customer's sentiment, as described herein.

As further shown in FIG. 1A, and by reference number 106, the intelligent case management platform may, using a case resolution AI model, predict potential scenarios by which the intelligent case management platform may automatically resolve (e.g., solve, complete, close out, and/or the like) the customer query. For example, the intelligent case management platform may execute a case resolution AI model, and automatically recommend one or more best-fit solutions (e.g., to a chatbot, an agent, and/or the like) for best resolving the query, based on historic data associated with similar queries. In some implementations, the case resolution AI model may generate a score (e.g., a level of confidence, and/or the like), by which the intelligent case management platform may determine and/or prioritize a list of recommended resolutions (e.g., solutions, tasks, offers, and/or the like), which may best resolve the customer query.

In some implementations, the intelligent case management platform may obtain a natural language description of a customer query and tag (e.g., classify, assign, and/or the like) the customer query to one or more domains (e.g., categories) and/or one or more case resolutions. As an example, the intelligent case management platform may obtain the natural language description, as text input, for a customer query associated with "update my e-mail address," tag the customer query to a domain (e.g., update customer profile), and tag the customer query to a case resolution (e.g., overwrite existing customer profile data with new data). Similarly, the intelligent case management platform may obtain the natural language description, as text input, for a customer query associated with "need to modify my reservation", tag the customer query to a domain (e.g., update reservation), and tag the customer query to a case resolution (e.g., assign agent for assistance). In this way, the intelligent case management platform may classify a customer query based on a textual description of the customer query, and generate multiple, possible case resolutions by which the intelligent customer management platform may automatically resolve the query. For example, in some implementations, one or more of the case resolution modules may perform case resolution tasks (e.g., updating a customer profile, sending the customer reservation information, and/or the like), by which the intelligent customer management platform may automatically resolve the customer query, without having to assign and/or involve an agent. In this way, the intelligent customer management platform may conserve network and/or computing resources, which would otherwise be wasted in attempting to manually resolve customer queries that may be resolved automatically.

In some implementations, the intelligent case management platform may perform one or more data preprocessing operations when executing the case resolution AI model, to classify a customer query and predict possible resolutions, as described herein. For example, a pre-processing module may receive a customer query, check for a set of blacklisted keywords (e.g., profane words, obscene words, offensive words, and/or the like) in the text, remove any blacklisted keywords from the text, and input the text into the case resolution AI model. The case resolution AI model may assign the customer query to a domain and perform a similarity (cosine) match to determine or obtain resolutions associated with the assigned domain. As an example, the customer query may be assigned to a "grievance request" domain, including example resolutions of "connect customer to an agent manager", "ask the customer to leave a message", and/or the like. In this way, the intelligent customer management platform may provide automated case resolution based on resolutions (e.g., tasks) associated with various domains.

In some implementations, the case resolution AI model may be trained by way of converting training set queries to structural formats using a word vectorizer (e.g., a TFIDF vectorizer). In some implementations, the case resolution AI model may be trained using textual data, voice data, or data associated with textual and/or voice data, and may predict domains using the word vectorizer. The training set of queries may be converted to a vector using the word vectorizer, and domains may be evaluated based on a test set. In some implementations, the intelligent case management platform may perform a training operation when generating the case resolution AI model. For example, the intelligent case management platform may portion the data into a training set, a validation set, a test set, and/or the like. In some implementations, the intelligent case management platform may train the case resolution AI model using, for example, an unsupervised training procedure based on the training set of the data. For example, the intelligent case management platform may perform dimensionality reduction to reduce the data to a minimum feature set, thereby reducing processing to train the case resolution AI model, and may apply a classification technique to the minimum feature set.

In some implementations, the intelligent case management platform may use a logistic regression classification technique to determine a categorical result (e.g., a domain, etc.), based on the input. For example, the intelligent case management platform may perform binary recursive partitioning to split the data of the minimum feature set into partitions and/or branches, and use the partitions and/or branches to perform predictions (e.g., domain predictions, case resolution predictions, and/or the like). Based on using recursive partitioning, the intelligent case management platform may reduce utilization of computing resources relative to manual, linear sorting, and analysis of data points, thereby enabling the use of thousands, millions, and/or the like, of data points to train a model, which may result in a more accurate model. Based on applying a rigorous and automated process to classify customer queries, the intelligent case management platform enables classification of hundreds, thousands, millions, and/or the like, of customer queries for resolving customer queries obtained from hundreds, thousands, millions, and/or the like, of customers, thereby increasing an accuracy and/or consistency of customer query resolution.

As further shown in FIG. 1A, and by reference number 108, the intelligent case management platform may attempt to automatically resolve the customer query, based on predicting the case resolutions using the case resolution AI model as described above. In some implementations, the intelligent case management platform may implement automatic case resolution by way of transmitting an instruction to a chatbot, which instructs the chatbot to perform an action, such as obtaining new customer profile data, storing new customer profile data, connecting the customer to a live agent, and/or the like. In some implementations, the intelligent case management platform may implement automatic case resolution by way of transmitting one or more best-fit resolutions to an agent, and prompting the agent to perform an action based on receiving the best-fit resolution, such as, for example, suggesting one or more of the best-fit solutions to the customer in an attempt to automatically, and intelligently resolve the query. In this way, inexperienced agents may be prompted with case resolutions that may be predicted to best solve a customer query, and essentially undergo electronic, on-the-job training using data obtained from the intelligent customer management platform. In this way, intelligent case management platform may automatically perform an automated case resolution, without having to consume computing resources that would otherwise be needed to open and/or assign a case.

In some implementations, the intelligent case management platform may be unable to automatically resolve the query. For example, certain queries may require the assistance of a live agent. Turning now to FIG. 1B, and by reference number 110, the intelligent case management platform may automatically create a case (e.g., open a case having a case identifier) associated with the customer query, and route and/or assign the case to the agent best suited to manage and/or resolve the case, as set forth herein. For example, the intelligent case management platform may automatically create the case by assigning the case a case identifier, determining an agent best suited to assist the customer based on determining an agent score, determining customer sentiment, and/or the like. The intelligent customer management platform may further establish contact with an agent so that the agent may access the intelligent case management platform and manage the case. In some implementations, the agent may access the intelligent case management platform by way of an agent interface. For example, the agent may login to the intelligent case management platform by way of a web portal, workstation, and/or the like. In some implementations, automatically creating the case by way of the case creation module of the intelligent case management platform includes transitioning the customer from chatting or interfacing with a chatbot, to chatting or interfacing with a live agent.

As further shown in FIG. 1B, and by reference number 112, the intelligent case management platform may obtain customer data, agent data, and/or the like, as described herein, and determine a current customer sentiment and/or determine agent analytics for use in intelligently, and automatically, assigning an agent to the newly created case and/or intelligently, and automatically, generating one or more offers by which the customer posing the customer query may be better served and/or potentially retained based on increasing a loyalty state of the customer.

In some implementations, one or more customer sentiment models may obtain data associated with the query, and determine an initial indication of the customer's sentiment (e.g., the customer's mood), upon initiation of the customer query, and continue monitoring the customer's sentiment during the entire case (e.g., monitoring strings of text exchanged between the customer and the agent), so that the case may be automatically re-assigned to another agent (e.g., a supervisor) where a sentiment score for the customer satisfies a threshold. In some implementations, an agent may be automatically matched or assigned to a case based on a customer's sentiment score, and the agent may further recommend offers or solutions based on the customer's sentiment score to satisfy the customer, and ultimately retain the customer.

In some implementations, the customer sentiment model may obtain strings of text or characters submitted, by the customer, during initiation of the customer query and/or during continued communications by way of one or more communication channels (e.g., communications between the customer and the chatbot, activity of the customer on a business's social media account, communications in an e-mail, and/or the like), and determine the customer's sentiment score using a natural language processing technique. Such techniques may analyze text (e.g., words (e.g., spoken, or written words), phrases, and/or sentences contained in the text) to determine the sentiment score. For example, a customer sentiment model may receive, as input, text (e.g., sentences, strings of text, spoken text, and/or the like) and predict, based on the text, the customer's sentiment by inferring positive, negative, or neutral sentiments using the customer sentiment model. As an example, the customer sentiment model of the intelligent case management platform may obtain the natural language description, as text input, for a communication including "I need a customer agent right now, or else!" and determine a sentiment score based on the input. In this case, the sentiment score may be used as a prediction or indication that the customer is feeling negative during interaction with the intelligent case management platform by way of the chatbot or agent. Similarly, the customer sentiment model of the intelligent case management platform may obtain the natural language description, as text input, for a communication including "may I please speak with an agent" and determine a sentiment score based on the input. In this case, the sentiment score may be used as a prediction or indication that the customer is feeling positive or neutral during interaction with the intelligent case management platform by way of the chatbot or agent.

In some implementations, the customer sentiment model of the intelligent case management platform may process the text input and generate a sentiment score for the customer. For example, the intelligent case management platform may obtain text from a customer, process the text, and classify the text as being positive, negative, or neutral, to generate the sentiment score. In this way, customers predicted as having a positive sentiment may be assigned an agent that may provide opportunities for add-ons, upgrades, and/or the like, which may further enhance the customers' experience. Similarly, customers predicted as having a negative sentiment may be assigned to an agent that may offer discounts, gifts (e.g., free items or services), increases in priority, promotions, benefits, points, and/or the like, to improve the customer's sentiment and prevent the customer from canceling a reservation, leaving the business, and/or the like. In some implementations, the intelligent case management platform may parse the text in natural language phrases and/or sentences, and analyze the structure of the text to infer the customer sentiment and determine the sentiment score. For example, the intelligent case management platform may obtain data identifying, in natural language, text exchanged during customer-chatbot or customer-agent interactions, and parse the natural language to identify characteristics indicative of the customer's sentiment.

In some implementations, the intelligent case management platform may perform one or more data preprocessing operations when executing the customer sentiment model to predict the sentiment scores, as described herein. For example, a pre-processing module may receive text being input by the user, check for a set of blacklisted keywords (e.g., profane words, and/or the like) in the text, remove any blacklisted keywords from the text, and input the text into the customer sentiment model. The customer sentiment model may classify the text, or portions of the text, as being indicative of a positive, negative, or neutral sentiment, to predict the customer's sentiment. In this way, the model may receive, as input, text provided by the customer, and output a sentiment score indicative of the customer's sentiment.

In some implementations, the customer sentiment model may be trained by building a dataset of vocabulary, and tagging or classifying the vocabulary to sentiment domains (e.g., positive, negative, neutral domains). In some implementations, the customer sentiment model may convert sentences to structured formats using a word vectorizer, classify the structured formats as sentiment domains based on the tagged vocabulary, and partition the structured formats to train the customer sentiment model. For example, when generating the customer sentiment model, the intelligent case management platform may partition the data into a training set, a validation set, a test set, and/or the like. In some implementations, the intelligent case management platform may train the customer sentiment model using, for example, an unsupervised training procedure based on the training set of the data. For example, the intelligent case management platform may perform dimensionality reduction to reduce the data to a minimum feature set, thereby reducing an amount of processing needed to train the customer sentiment model, and may apply a classification technique, to the minimum feature set.

In some implementations, the intelligent case management platform may use a logistic regression classification technique to determine a categorical result (e.g., a sentiment domain, etc.), as described above. For example, the intelligent case management platform may perform binary recursive partitioning to split the data of the minimum feature set into partitions and/or branches, and use the partitions and/or branches to perform predictions (e.g., sentiment predictions). Based on using recursive partitioning, the intelligent case management platform may reduce utilization of computing resources relative to manual, linear sorting, and analysis of data points, thereby enabling the use of thousands, millions, and/or the like, of data points to train the customer sentiment model, which may result in a more accurate model. Based on applying a rigorous and automated process to determine sentiment, the intelligent case management platform enables analysis of hundreds, thousands, millions, and/or the like, of strings of text to predict customer sentiment, thereby increasing an accuracy and/or consistency of such predictions.

Additionally, or alternatively, the intelligent case management platform may train the customer sentiment model using one or more model training techniques, such as a recurrent neural network technique. In this case, the training data set may be used to train the customer sentiment model by way of one or more model training parameters, such as, for example, 10 epochs, three hidden layers, and tanh activation functions, to detect patterns and/or trends in textual data that may otherwise be undetectable to human analysts or systems, using less complex techniques, to train the customer sentiment model.

Additionally, or alternatively, the intelligent case management platform may be configured to evaluate the customer sentiment model, using, for example, a confusion matrix. The confusion matrix may include an accuracy percentage, a precision percentage, and a recall percentage, which indicate the percentage of cases that are correctly identified by the customer sentiment model. In this way, the customer sentiment model may be continually assessed and refined to continually improve the accuracy and/or consistency associated with predicting customer sentiment. In this way, the customer sentiment model may more accurately infer a customer's state of mind (e.g., mood), which may be used to intelligently assign an agent to the customer and/or intelligently determine which offers to present to the customer, as described herein.

Still referring to reference number 112, and in some implementations, the intelligent case management platform may perform analytics of multiple agents, for example, in a pool of agents, to determine an agent best suited to resolve the customer query (e.g., based on the domain) and/or best suited for serving the customer initiating the customer query (e.g., based on customer sentiment, a customer loyalty score, a customer membership level, based on a demographic of the customer, based on a geographic location of the customer, based on a language spoken by the customer, and/or the like). In some implementations, the intelligent case management platform may, using one or more agent analytics models or algorithms, determine scores for the agents based on executing the one or more agent analytics models or algorithms. The scores may indicate which agents, in the pool of agents, may best serve the customer and/or best resolve the query. In some implementations, the scores indicate a level of confidence that an agent may best solve the customer query, and maintain the sentiment score at a satisfactory threshold. An agent analytics model may perform the agent analytics based on a plurality of data points or inputs, such as an aggregate customer sentiment associated with past queries resolved by an agent, an aggregate number of past queries resolved by the agent, a real-time (e.g., current) sentiment score as determined by the customer sentiment model, a query domain as determined by the case resolution model, customer data (e.g., a customer loyalty score, a customer membership level or tier, and/or the like), and/or the like, to determine an agent best suited to resolve the query and/or serve the customer. In this way, an agent may be intelligently matched to a specific query and/or a specific customer, based on the agent analytics.

In some implementations, the agent analytics model may determine an agent score based on assigning a value to customer sentiment (e.g., 1=positive, 0=neutral, −1=negative, and/or the like), determining an average value associated with sentiments for past cases involving the agent, comparing the average value to a threshold, and grouping the agent based on a case domain and/or a customer membership level or tier (e.g., a platinum level customer, a gold level customer, and/or the like). In this way, the agent performance score may be used to rank (e.g., sorted by score) and assign agents best suited to resolve specific query domains and/or customer membership levels. In this way, experienced agents may be matched to specific queries and/or customers, so that higher priority queries (e.g., based on sentiment) and/or higher-priority customers (e.g., based on membership levels) may be served by experienced, qualified agents having a past record of positively resolving similar queries and/or satisfying similar customers. In this way, the intelligent case management platform may determine case assignments based on the agent's past performance at granular levels, thereby ensuring that the best agents may be assigned to service premium level customers and/or customers experiencing negative sentiments, currently, or in the past. This, in turn, enhances the customer experience and increases customer retention. Further, in this way, network resources and/or computing resources that would otherwise be consumed to perform randomized agent assignment, may be obviated.

As further shown in FIG. 1B, and by reference number 114, the intelligent case management platform may execute logic by which an indication of a customer's loyalty state may be predicted or determined. The logic may include one or more algorithms configured to predict the customer's current loyalty state, and future loyalty state, as described herein. The customer may be assigned a risk level based on the current loyalty state, the future loyalty state, and/or a result of comparing the current loyal state and the future loyalty state, in some implementations. In this way, the intelligent customer management platform may predict which customers are at risk, and cause actions to be performed based on determining that a customer is at risk. Such actions may include, for example, assigning an experienced agent to manage the case, presenting tailored offers to the customer to increase the customer's loyalty state, and/or the like.

In some implementations, the intelligent customer management platform is configured to determine a customer's currently loyalty state based on assigning a customer a current loyalty score. In some implementations, the current loyalty score may be determined based on a statistical algorithm executed or implemented by a loyalty predicting engine of the intelligent customer management platform. In some implementations, the current loyalty score may indicate whether a customer is loyal, extremely loyal, or at-risk for leaving the business. As an example, the current loyalty score may, in some implementations, include a number from 1 to 5, where 1 indicates the customer's loyalty state as unknown, 2 indicates the customer's loyalty state as being lost, 3 indicates the customer's loyalty state as being at-risk, 4 indicates the customer's loyalty state as being loyal, and 5 indicates the customer's loyalty state as being extremely loyal. Other implementations of determining and/or assigning loyalty scores not inconsistent with the instant disclosure, are contemplated.

In some implementations, the customer's current loyalty score may be determined based on performing a recency, frequency, and monetary value (RFM) analysis. For example, the intelligent customer management platform may obtain, using a customer identifier, customer data. The customer data may include and/or be associated with a recency of a past purchase by the customer, a frequency of past purchases by the customer, and/or a monetary value associated with the past purchases by the customer. For example, the recency data may include and/or indicate a date or a timestamp associated with the past purchase by the customer, the frequency data may include and/or indicate a number (e.g., a quantity) of past purchases by the customer, and the monetary value may include a dollar amount (e.g., a total dollar amount, an average dollar amount, and/or the like) associated with the past purchases by the customer. The intelligent customer management platform may further obtain aggregate customer data associated with a plurality of customer purchases using, for example, a plurality of customer identifiers. In some implementations, the intelligent customer management platform may calculate RFM values (e.g., see FIG. 2A), based on comparing the customer data and the aggregate customer data, as described herein. The RFM values may be used to determine the customer's current loyalty score based on application of Pareto's 80-20 rule as described herein. The customer's current loyalty score may be used as input to the one or more models described herein, for intelligently assigning agents best suited to serve the customer, for intelligently determining offers best suited to retain the customer, and/or the like.

In some implementations, the RFM values may be used to segment customers, in an aggregate customer base, for use in generating visual graphics by which an agent may rapidly assess a customer's current loyalty score, and gain insight into the customer's behavioral patterns, such as the customer's spending habits. As described further herein (e.g., see FIGS. 2C and 2D), visual graphics may be used to indicate the recency, frequency, and monetary values associated with a customer, which an agent may utilize or consult when resolving and/or managing the case. For example, the agent may determine, based on a visual graphic of the customer's RFM values, that a customer is an extremely lucrative customer. The agent may determine specific add-ons or upgrades to offer the customer based on the intelligence derived by visually examining such visual graphics.

Still referring to reference number 114, and in some implementations, the intelligent customer management platform may determine or predict a customer's lifetime value (CLV) based on the RFM values obtained from the RFM analysis, and use the CLV in determining a customer's future loyalty state. For example, a CLV model, such as a Pareto-negative binomial distribution (NBD), by 'til you die (BTYD) model, may be used to determine a predicted number of times (e.g., a predicted frequency of future purchases) the customer may purchase from the business over a predetermined time (e.g., a year, 18 months, and/or the like), and a predicted monetary value (e.g., a predicted average amount) that the customer may spend when purchasing from the business. The intelligent customer management platform may train, validate, and/or evaluate the model using any of the processes previously described above. In some implementations, the intelligent customer management platform may generate the Pareto-NBD model for non-contractual customers based on 18-months of aggregate customer data (e.g., aggregate RFM data). The intelligent customer management platform may obtain twelve months of RFM data for training the model, and validate the accuracy of the model based on the remaining six months of RFM data. The trained model, when, supplied with a time period by which to forecast (e.g., 12 months, 18 months, etc.) values, may output CLVs, such as the predicted number of visits and/or the predicted amount of expenditure by the customer.

In some implementations, the intelligent customer management platform may predict a customer's future loyalty score based on performing a subsequent RFM analysis on the CLVs, including, for example, the predicted spend. For example, the intelligent customer management platform may perform the initial RFM analysis to obtain a customer's current RFM values, generate CLVs (i.e., predicted frequency of visits and predicted expenditure) based on the initial RFM analysis, and perform a subsequent RFM analysis on the predicted spend to predict the customer's predicted loyalty state, in the form of a predicted loyalty score. The predicted loyalty score may include a value of 1 to 5, as described above, or any other value, range, or threshold not inconsistent with the instant disclosure. In some implementations, the customer's current loyalty score may be compared to the customer's predicted loyalty score for determinizing a risk level. The risk level may indicate a customer's likelihood of leaving the business currently, or in the future, based on a result of comparing the current loyalty score and the predicted loyalty score. The risk level may also be used, as input, to any of the previously described case resolution model, agent analytics model, and/or an offer generating engine of the intelligent customer management platform, for use in providing intelligent case management as described herein.

As further shown in FIG. 1B, and by reference number 116, the intelligent case management platform may assign the case to an agent based on a result of any of the agent score obtained by way of the agent analytics model, the sentiment score obtained by way of the customer sentiment model, and/or the current or predicted customer loyalty score obtained by way of the loyalty predicting engine. In some implementations, the intelligent customer management platform may correlate the agent score, the sentiment score, the current loyalty score, and/or the predicted loyalty score for use in intelligent agent assignment. In this way, computing and network resources associated with randomly assigning agents, including underperforming agents, may be obviated. When assigning the case to an agent, the intelligent customer management platform may transmit an instruction, a notification, or other information to the agent, by which the agent may access the case by way of engaging and/or interfacing with the intelligent customer management platform.

Turning now to FIG. 1C, and as shown by reference number 118, the agent may access the intelligent customer management platform to provide intelligent case management. In some implementations, the agent may login to the intelligent case management platform by way of a web portal or workstation. The agent may access the assigned case using a case identifier, a customer identifier, and/or the like. In some implementations, the agent may access the intelligent customer management platform during a customer session (e.g., a chat session, a call, and/or the like).

As further shown in FIG. 1C, and by reference number 120, the agent may, using the intelligent case management platform, determine that a customer's loyalty is at risk, and cause one or more actions to be performed based on determining that the customer's loyalty is at risk. In some implementations, the customer's loyalty is determined to be at risk based on whether the customer's current loyalty score satisfies a threshold, whether the customer's sentiment score satisfies a threshold, whether the customer's predicted loyalty score satisfies a threshold, and/or based on a result of comparing one or more of the customer's scores by way of the intelligent customer management platform. In some implementations, the agent may determine that the customer's loyalty is at risk by way of a report generated by the intelligent customer management platform, and/or a visual graphic generated by the intelligent customer management platform for display to the agent, using, for example, a user interface and/or the like. In some implementations, the intelligent customer management platform may cause one or more actions to be performed based on determining the customer's loyalty score is at risk. Such actions may include, for example, automatically generating one or more offers to present to the customer based on the determination, automatically causing a change in a configuration of another device to remedy a complaint that the customer had (e.g., causing the quantity of services provided to the customer to automatically increase or decrease, automatically configuring a permissible bandwidth associated with the customer's account to increase or decrease, automatically causing a discount to be applied to an account of the customer, and/or the like), and/or the like.

As further shown in FIG. 1C, and by reference number 122, the intelligent case management platform may generate one or more offers. In some implementations, the offers may be generated by one or more offer generating models, and presented to the customer for improving customer relations, improving customer sentiment, improving the customer's loyalty score, and/or the like. In some implementations, the offers generated by the intelligent customer management platform may be intelligently determined, based on customer preferences and/or customer behaviors (e.g., customer spending habits), so that the offer may be tailored for the specific customer. In this way, expenditure of computing resources and/or network resources used to generate irrelevant offers may be obviated. In this way, the intelligent customer management platform may access hundreds, thousands, millions, or more, data points for use in generating offers specifically tailored to the customer.

As an example, the intelligent customer management platform may determine that a customer's loyalty is at risk, and generate an offer to discount the customer's service, extend the customer's service (e.g., extend the customer's hotel reservation, extend the customer's massage by 30 minutes, etc.), offer a gift (e.g., a free service, a free item, and/or the like), and/or the like, in an effort to retain the customer. In some implementations, the intelligent customer management platform may analyze the customer's past purchases and determine, based on the examining historic customer data, to offer the customer discounted food and or beverage items, discounted spa services, discounted golf services, and/or the like, based on determining that the customer spends a threshold amount of money on such services during past visits or on services that have been determined to relate to such services (e.g., by looking at past customer behavior, intelligent customer management platform may determine that customers who typically visit a particular spa also visit a particular local restaurant). In this way, the generation and/or presentation of offers may be improved, and specifically tailored to the customer's personal interests and/or attributes. In some implementations, an offer generating model may generate a score for an existing offer provided by a business, and present the offer to the customer based on the score. In some implementations, the score may predict a measure of relevancy of the offer to the user.

As further shown in FIG. 1C, and by reference number 124, the intelligent case management platform may cause one or more actions to be performed based on generating the offers. Such actions may include, for example, transmitting the offers to the customer, accessing a reservation system to modify a reservation, accessing a reservation system to upgrade a reservation, update a reservation system to add-on services or items to the reservation, accessing a reservation system to apply a discount, accessing an inventory system to send a gift, and/or the like. In some implementations, the AI models and algorithms employed by the intelligent customer management platform provide actionable insights, by which an agent may assess a customer query, assess a customer, and apply intelligence in retaining the customer by way of providing targeted offers, suggesting targeted add-ons, and/or the like.

As further shown in FIG. 1C, and by reference number 126, the intelligent case management platform may monitor (e.g., continuously, periodically, and/or the like) a customer sentiment during customer-agent interactions during a session, and automatically reassign the case to another agent where the customer sentiment satisfies a threshold. For example, where the customer sentiment changes from positive to negative during interaction with a first agent, the intelligent customer management platform may re-assign the case to a second agent. In this way, the second agent may redeem the business by providing a more positive customer experience, and better retain the customer. The intelligent customer management platform may monitor customer sentiment by way of obtaining customer input (e.g., strings of text, voice data, and/or the like), and using natural language processing techniques to predict the sentiment as described above.

In some implementations, the intelligent customer management platform may log data, actions, and/or sentiments associated with the customer query. In this way, the models used to automate case assignment, case creation, agent assignment, offer generation, and/or the like, may be continually refined based on newly generated data for improved, more accurate predictions.

In this way, intelligent case management platform automatically may perform an automation of case creation, case resolution, agent assignment, customer analytics, and/or offer generation on a query-specific and/or customer-specific basis. The automated tasks may be performed in real-time, or near real-time, at efficient speeds, so that the customer may not experience significant lag between the customer query initiation and resolution. Based on performing the automated tasks for each customer and/or each customer query, the intelligent case management platform improves a rate of customer retention, improves case resolution, and thereby reduces a likelihood that a customer may leave a business. Furthermore, based on automatically obtaining and/or analyzing data from intelligent customer management platform data structures, based on automatically obtaining and/or analyzing real-time customer sentiment, based on intelligently assigning agents to a query based on analytics, and/or the like, intelligent case management platform may reduce a utilization of processing resources and/or network resources otherwise required to randomly connect and assign agents to a query.

As indicated above, FIGS. 1A-1C are provided merely as an example. Other examples are possible and may differ from what was described with regard to FIGS. 1A-1C.

FIGS. 2A-2E are diagrams of example implementations described herein. Such example implementations depict example inputs, example processes, and/or example outputs utilized by the intelligent case management platform for providing intelligent case management.

Turning now to FIG. 2A, an example implementation 200 is provided for predicting customer loyalty scores using statistical algorithms or models. As shown in FIG. 2A, and by reference number 202 (e.g., see steps (a) to (f)), customers may be assigned recency values of between 1 and 5, based on application of Pareto's 80-20 rule. For example, recency data for a customer, associated with the customer query, may be compared to aggregate customer data, whereby the customer is provided in a pool of customers and the pool is successively subdivided according to Pareto's rule, by which recency values are assigned. As a specific example, a customer, having a unique customer identifier, may be provided in a pool of customers (e.g., aggregate customers) having customer identifiers. The customers, in the pool of customers, may be arranged in descending order based on recency of a purchase from a business, a visit to the business, and/or the like, for a predetermined time period (e.g., a year, 18 months, etc.). One-fifth (i.e., 20%) of the customers in the pool of customers may be assigned a score of 5. The remaining 80% of the original customer pool may be subdivided, and 20% those customers may be assigned a score of 4. Further, 80% of the remaining customer pool may be subdivided, and 20% of the remaining customers may be assigned a score of 3. Further, 80% of the remaining customer pool may be subdivided, and 20% those customers may be assigned a score of 2. Further, 80% of the remaining customer pool may be subdivided, and 20% those customers may be assigned a score of 1. In this way, the customer may be statistically assigned a recency score.

Similarly, as shown in FIG. 2A, and by reference number 204, (e.g., see steps (a) to (g)), customers may be assigned frequency values of between 1 and 5, based on application of Pareto's 80-20 rule. For example, frequency data for a customer, associated with the customer query, may be compared to aggregate customer data, whereby the customer is provided in a pool of customers and the pool is successively subdivided according to Pareto's rule, by which frequency values are assigned. As a specific example, a business may set a frequency threshold (e.g., a minimum of 2 visits to the business per year, a minimum of 5 visits to the business per year, etc.) and provide a customer in a pool of customers based on the frequency threshold. The customers, in the pool of customers, may be arranged in descending order (e.g., from a maximum number of visits to the frequency threshold) based on the frequency of visits to the business for a predetermined time period. One-fifth (i.e., 20%) of the customers in the pool of customers may be assigned a score of 5. The remaining 80% of the original customer pool may be subdivided, and 20% those customers may be assigned a score of 4. Further, 80% of the remaining customer pool may be subdivided, and 20% of the remaining customers may be assigned a score of 3. Further, 80% of the remaining customer pool may be subdivided, and 20% those customers may be assigned a score of 2. Further, 80% of the remaining customer pool may be subdivided, and 20% those customers may be assigned a score of 1. In this way, the customer may be statistically assigned a frequency score.

Similarly, as shown in FIG. 2A, and by reference number 206, (e.g., see steps (a) to (f)), customers may be assigned monetary values of between 1 and 5, based on application of Pareto's 80-20 rule. For example, monetary value data for a customer, associated with the customer query, may be compared to aggregate customer data, whereby the customer is provided in a pool of customers and the pool is successively subdivided according to Pareto's rule, by which monetary values are assigned. As a specific example, a customer may be provided in a pool of customers. The customers, in the pool of customers, may be arranged in descending order based on an average monetary expenditure from a business. One-fifth (i.e., 20%) of the customers in the pool of customers may be assigned a score of 5. The remaining 80% of the original customer pool may be subdivided, and 20% those customers may be assigned a score of 4. Further, 80% of the remaining customer pool may be subdivided, and 20% of the remaining customers may be assigned a score of 3. Further, 80% of the remaining customer pool may be subdivided, and 20% those customers may be assigned a score of 2. Further, 80% of the remaining customer pool may be subdivided, and 20% those customers may be assigned a score of 1. In this way, the customer may be statistically assigned a monetary value score.

Turning now to FIG. 2B, an example implementation 210 is provided for performing an RFM analysis based on the RFM values determined in FIG. 2A. Current customer loyalty scores may be determined, based on the RFM analysis, according to some implementations. For example, and by reference number 212 (see, e.g., steps (A)-(G)), a customer may be assigned a current loyalty score from 1-5 based on application of Pareto's 80-20 rule. The customer loyalty score may predict a customer's current loyalty state, and may be used in automatic agent assignment models, offer generation models, and/or the like, by which the customer may be better served and/or retained by way of intelligence provided using the intelligent customer management platform. As an example, customers having a recency score of 5, a frequency score of 5 or 4, and a monetary value score of 3, 4, or 5, may be assigned a RFM score of 5. Customers having a recency score of 4, a frequency score of 5 or 4, and a monetary value score of 3, 4, or 5, may be assigned a RFM score of 4. Customers having a recency score of 3, a frequency score of 3, 4, or 5, and a monetary value score of 2, 3, 4, or 5, may be assigned a RFM score of 3. Customers having a recency score of 2, a frequency score of 3, 4, or 5, and a monetary value score of 2, 3, 4, or 5, may be assigned a RFM score of 2.

Customers having a recency score of 1, a frequency score of 1-5, and a monetary value score of 1-5, may be assigned a RFM score of 1.

As FIG. 2B further illustrates, a RFM score of 5 indicates a highly loyal customer, a RFM score of 4 indicates a loyal customer, a RFM score of 3 indicates a loyalty at risk customer, a RFM score of 2 indicates a loyalty lost customer, and a RFM score of 1 indicates an unknown loyalty customer. In this way, a customer pool may be segmented and visually depicted by providing a scatter plot of frequency versus recency. The size of the data points (e.g., bubbles) on the scatter plot may correspond to an average monetary value of the customer.

Figure 2C:
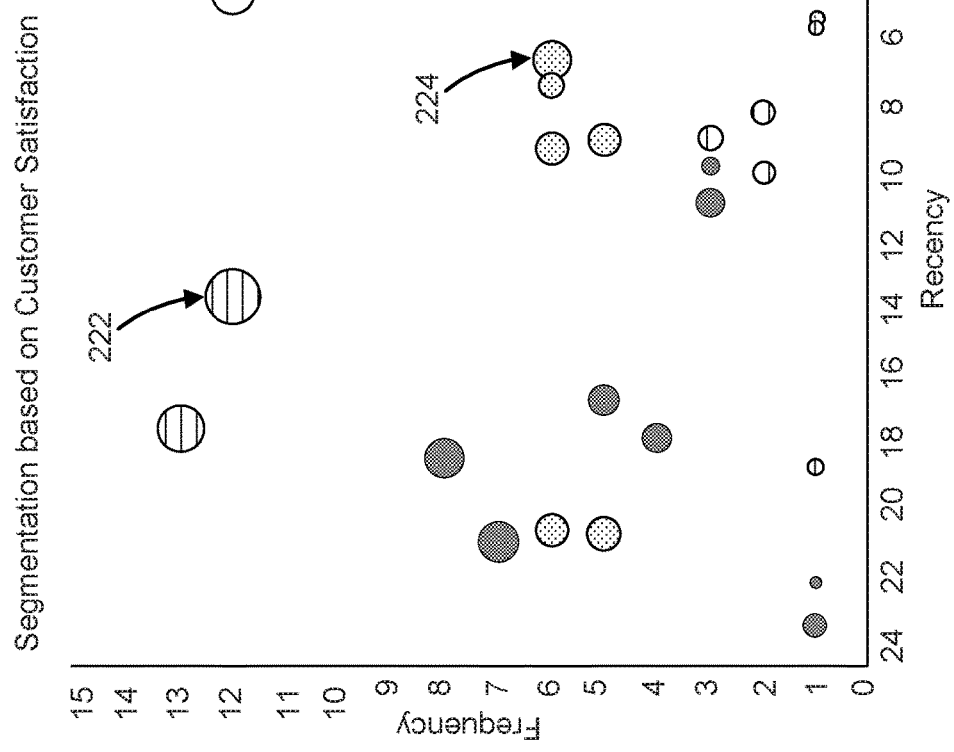

Turning now to FIG. 2C, an example implementation 220 is provided for illustrating customer segmentation based on the RFM analysis performed in FIG. 2B. The RFM analysis may be used to generate visual diagrams for multiple customers, by the intelligent customer management platform, for visually depicting customers' loyalty states and behaviors. In this way, agents may quickly assess the loyalty state of a pool of customers, and perform actions based on the assessment. For example, where an agent identifies a customer as being unhappy or disengaged, the agent may perform actions to mend the relationship (e.g., make an offer to the customer, offer a gift to the customer, and/or the like). As FIG. 2C illustrates, the x-axis indicates a recency (in a number of months) of a customer's interaction with a business (e.g., a recency of a purchase, a visit, and/or the like), and the y-axis indicates the frequency (e.g., quantity) of the customer's interaction with the business.

In some implementations, the agent may be able to obtain granular data (e.g., an average expenditure by a customer, frequency values for a customer, spend insights (see, e.g., FIG. 2E), etc.), associated with a customer, by way of clicking on a data point (e.g., a bubble) of the visual diagram shown in FIG. 2C, obtain a customer identifier associated with the data point, and perform an action based on the granular data obtained for that customer identifier. As a specific example, where an agent clicks on a data point identified by reference number 222 (e.g., a dissatisfied, high value customer), the agent may obtain the customer identifier associated with the customer represented by the data point, and contact the customer to offer the customer targeted discounts or gifts, to better retain the customer. As another example, where an agent clicks on a data point identified by reference number 224 (e.g., a satisfied, low value customer), the agent may obtain the customer identifier associated with the customer represented by the data point, and send the customer a promotional email, to encourage the customer to increase expenditure(s).

Figure 2D:
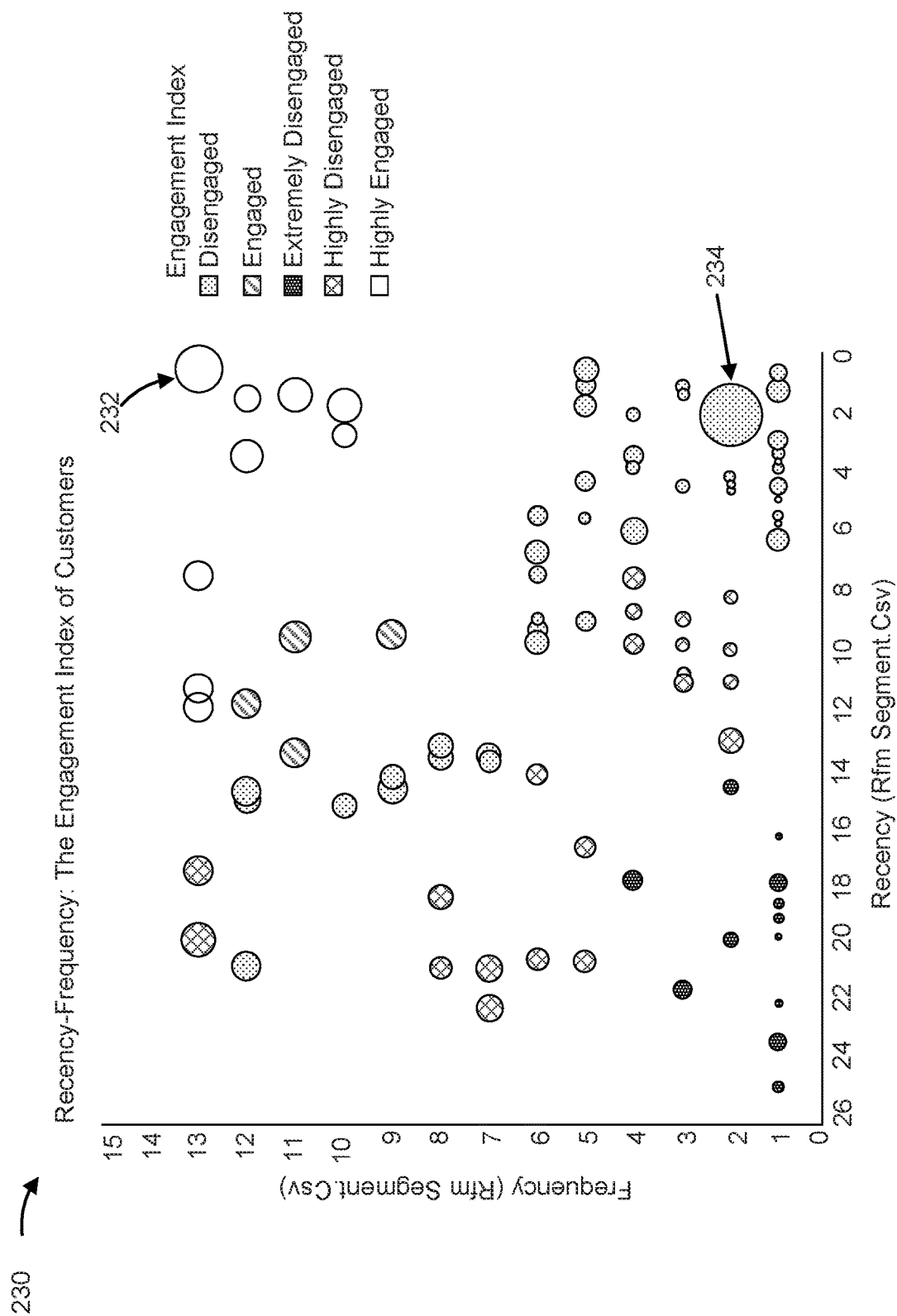

Turning now to FIG. 2D, an example implementation 230 is provided for illustrating customer segmentation based on engagement using the RFM analysis performed in FIG. 2B. As FIG. 2D illustrates, an agent may quickly assess whether customers are engaged or disengaged with the business, and perform one or more actions based on the assessment. Where a customer is engaged, the agent may offer add-ons, upgrades, and/or the like. Where a customer is disengaged, the agent may offer gifts, points, discounts, and/or the like. As FIG. 2D illustrates, the x-axis indicates a recency (in a number of months) of a customer's interaction with a business (e.g., a recency of a purchase, a visit, and/or the like), and the y-axis indicates the frequency (e.g., quantity) of the customer's interaction with the business. The size of the bubbles in FIGS. 2C and 2D may indicate an average customer spend. In this way, the agent may quickly ascertain which customers may be lucrative as compared to other customers. In this way, the agent may decide to focus more attention or efforts on retaining the more lucrative customers.

In some implementations, an agent may be able to obtain granular data associated with a customer, by way of clicking on a data point (e.g., a bubble) of the visual diagram shown in FIG. 2D, obtain a customer identifier associated with the data point, and perform an action based on the granular data obtained for that customer identifier. As a specific example, where an agent clicks on a data point identified by reference number 232 (e.g., a highly engaged, high value customer), the agent may obtain the customer identifier associated with the customer represented by the data point, and send the customer targeted discounts or gifts, to retain the engaged, high value customer. In some implementations, the agent may request feedback, by way of ratings or surveys, from the highly engaged customers, as such customers may be more willing and/or likely to provide such information based on a level of engagement. As another example, where an agent clicks on a data point identified by reference number 234 (e.g., a disengaged, high value customer), the agent may obtain the customer identifier associated with the customer represented by the data point, and personally contact the customer, inviting the customer to participate in a special event or promotion, in an effort to increase an engagement level of the customer.

Figure 2E:
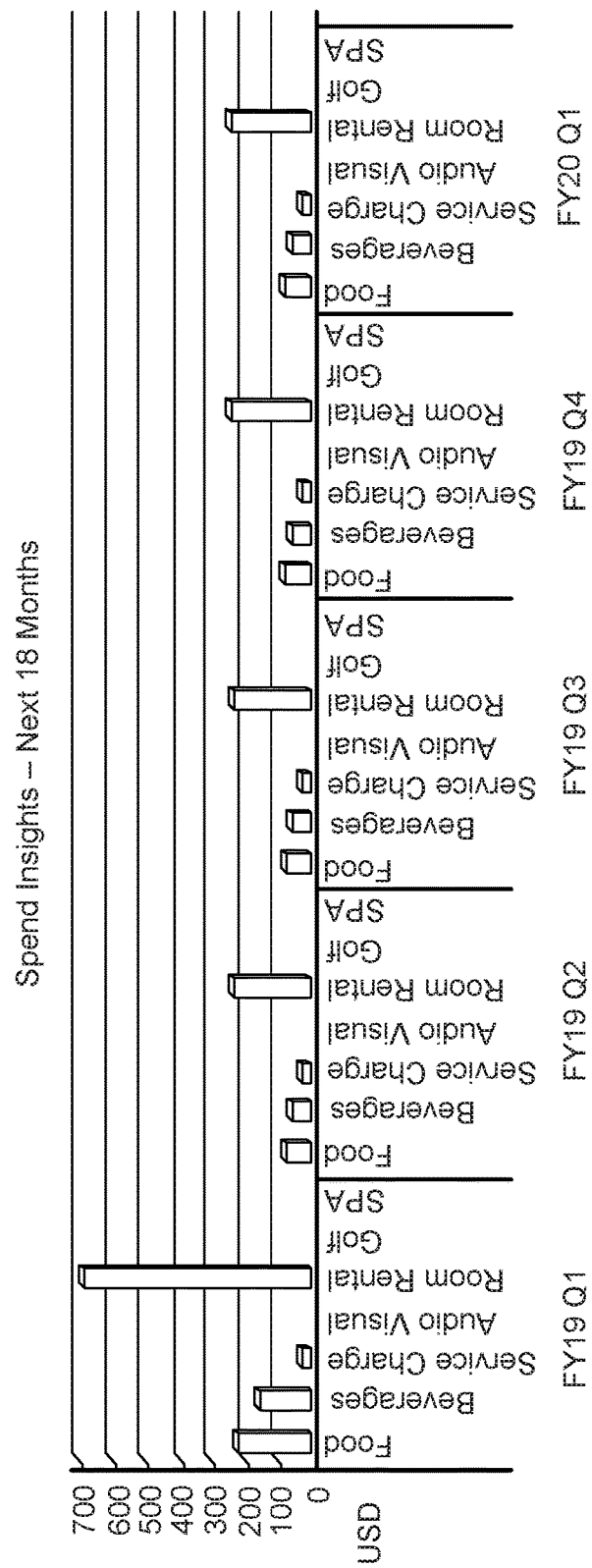

Turning now to FIG. 2E, an example implementation 240 is provided for illustrating customer spends insights provided by the intelligent customer management platform, based on the RFM analysis performed in FIG. 2B. In some implementations, such spends insights may be used to determine a customer's spending behavior or patterns, for example, based on customer data obtained during past interactions with a business. In some implementations, the spend insights may be provided upon clicking a data point associated with FIG. 2C or 2D, for providing granular level insight into expenditures for a customer. In some implementations, the expenditures may be grouped based on a spend category, such as food, beverage, service charge, audio/ visual, room rental, golf, spa, and/or the like. The intelligent customer management platform may determine or predict a customer's future spend pattern as a function of the customer's past or current spend pattern, including determining the CLVs, as described above. The spend pattern may be performed for a definite period of time (e.g., 18 months). As FIG. 2E illustrates, the customer's expenditures may be forecasted for a predetermined amount of time. Such forecasts may be used, by the intelligent customer management platform, to intelligently generate and/or select one of several predesigned offers for assisting agents in resolving customer grievances. In this way, the intelligent customer management platform may intelligently select and recommend offers to present to a customer, which may be tailored to the specific customer.

In this way, the customer data may be intelligently analyzed to predict future spending patterns, by which an agent may gain insight into the customer's preferences and/or behaviors to provide more precisely targeted offers and promotions, which further improves customer retention. In this way, the management of cases may be more automated, efficient, and consistent, thereby conserving network resources (e.g., signaling resources, communication interfaces, bandwidth, and/or the like) that would otherwise be needed to randomly distribute cases to hundreds or thousands of agents.

As indicated above, FIGS. 2A-2E are provided merely as an example. Other examples are possible and may differ from what was described with regard to FIGS. 2A-2E.

Figure 3:
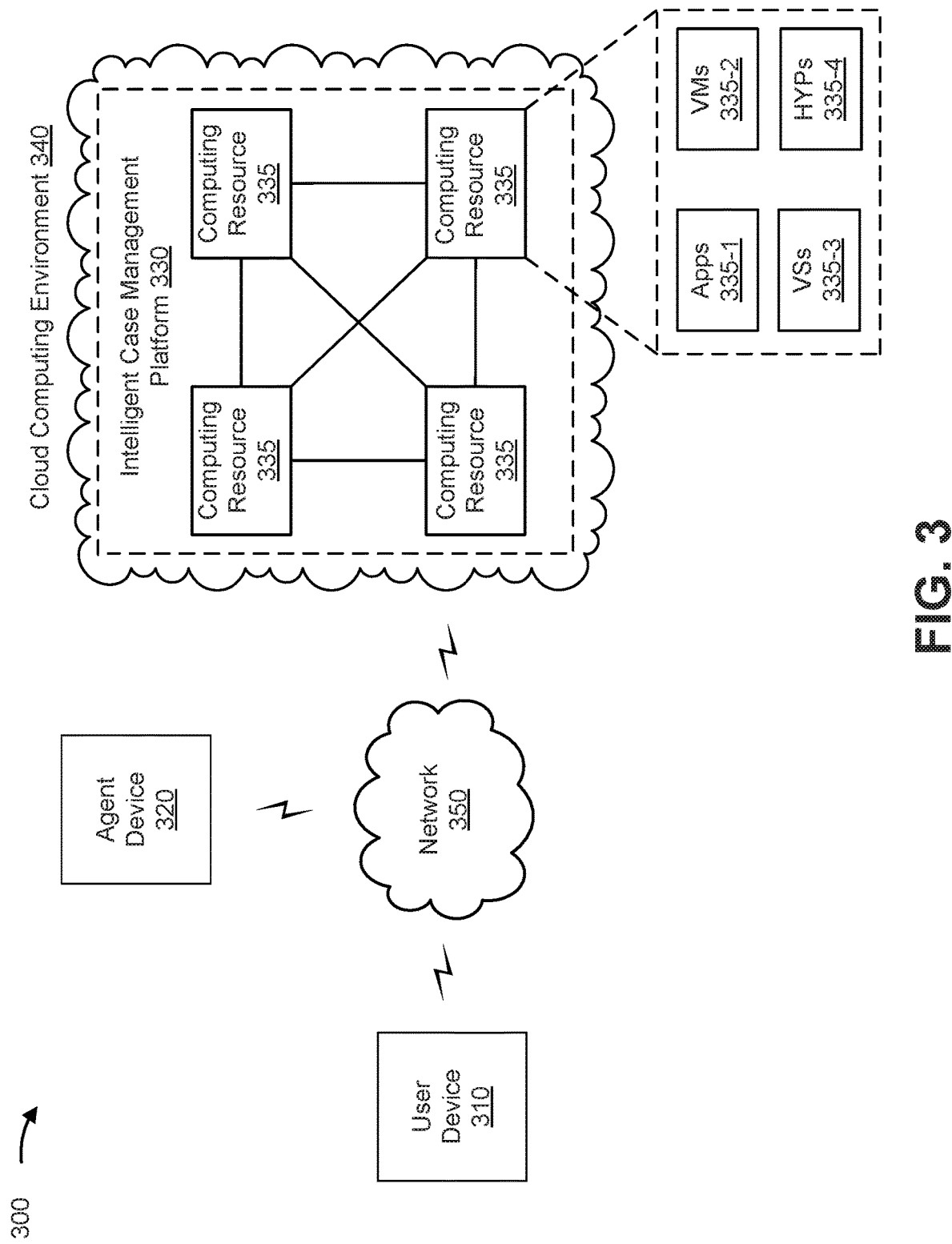
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a user device 310, an agent device 320, an intelligent case management platform 330, a computing resource 335, a cloud computing environment 340, and a network 350. Devices of environment 300 may interconnect via wired connections, wireless connections, or a combination of wired and wireless connections.

User device 310 includes one or more devices capable of receiving, generating, storing, processing, and/or providing information associated with providing intelligent case management. For example, user device 310 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Agent device 320 includes one or more devices capable of receiving, generating, storing, processing, and/or providing information associated with providing intelligent case management. For example, agent device 320 may include a workstation computer, a laptop computer, a tablet computer, a handheld computer, a gaming device, a wearable communication device (e.g., a smart wristwatch, a pair of smart eyeglasses, etc.), a mobile phone (e.g., a smart phone, a radiotelephone, etc.), a virtual machine (VM) provided in a cloud computing environment, or a similar type of device.

Intelligent case management platform 330 includes one or more computing resources assigned to provide intelligent case management. For example, intelligent case management platform 330 may be a platform implemented by cloud computing environment 340 that may perform intelligent case management for customer queries, based on automatic case assignment, automatic agent assignment, intelligent prediction of customer loyalty scores, risk levels, and/or the intelligent matching of customers to offers. In some implementations, intelligent case management platform 330 may include a server device or a group of server devices. In some implementations, intelligent case management platform 330 may be hosted in cloud computing environment 340.

While the example environment 300 indicates intelligent case management platform 330 as being implemented in a cloud computing environment 340, in some implementations, intelligent case management platform 330 may be implemented by one or more other types of devices as well, such as a server, computer, laptop computer, tablet computer, handheld computer, or the like. In some implementations, intelligent case management platform 330 may not be cloud-based or may be partially cloud-based.

Cloud computing environment 340 includes an environment that delivers computing as a service, whereby shared resources, services, and/or the like, may be provided to provide intelligent case management. Cloud computing environment 340 may provide computation, software, data access, storage, and/or other services that do not require end-user knowledge of a physical location and configuration of a system and/or a device that delivers the services. As shown, cloud computing environment 340 may include intelligent case management platform 330 and computing resource 335 of intelligent case management platform 330.

Computing resource 335 includes one or more personal computers, workstation computers, server devices, or another type of computation and/or communication device. In some implementations, computing resource 335 may host intelligent case management platform 330. The cloud resources may include compute instances executing in computing resource 335, storage devices provided in computing resource 335, data transfer devices provided by computing resource 335, etc. In some implementations, computing resource 335 may communicate with other computing resources 335 via wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 may include one or more software applications that may be provided to or accessed by user device 310. Application 335-1 may eliminate a need to install and execute the software applications on user device 310, agent device 320, and/or the like. For example, application 335-1 may include software associated with intelligent case management platform 330 and/or any other software capable of being provided via cloud computing environment 340. In some implementations, one application 335-1 may send/receive information to/from one or more other applications 335-1, via virtual machine 335-2.

Virtual machine 335-2 may include a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program, and may support a single process. In some implementations, virtual machine 335-2 may execute on behalf of a user (e.g., user device 310, agent device 320, and/or the like), and may manage infrastructure of cloud computing environment 340, such as data management, synchronization, or long-duration data transfers.

Virtualized storage 335-3 may include one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems, and may manage the execution of the guest operating systems. Multiple instances of a variety of operating systems may share virtualized hardware resources.

Network 350 may include one or more wired and/or wireless networks. For example, network 350 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
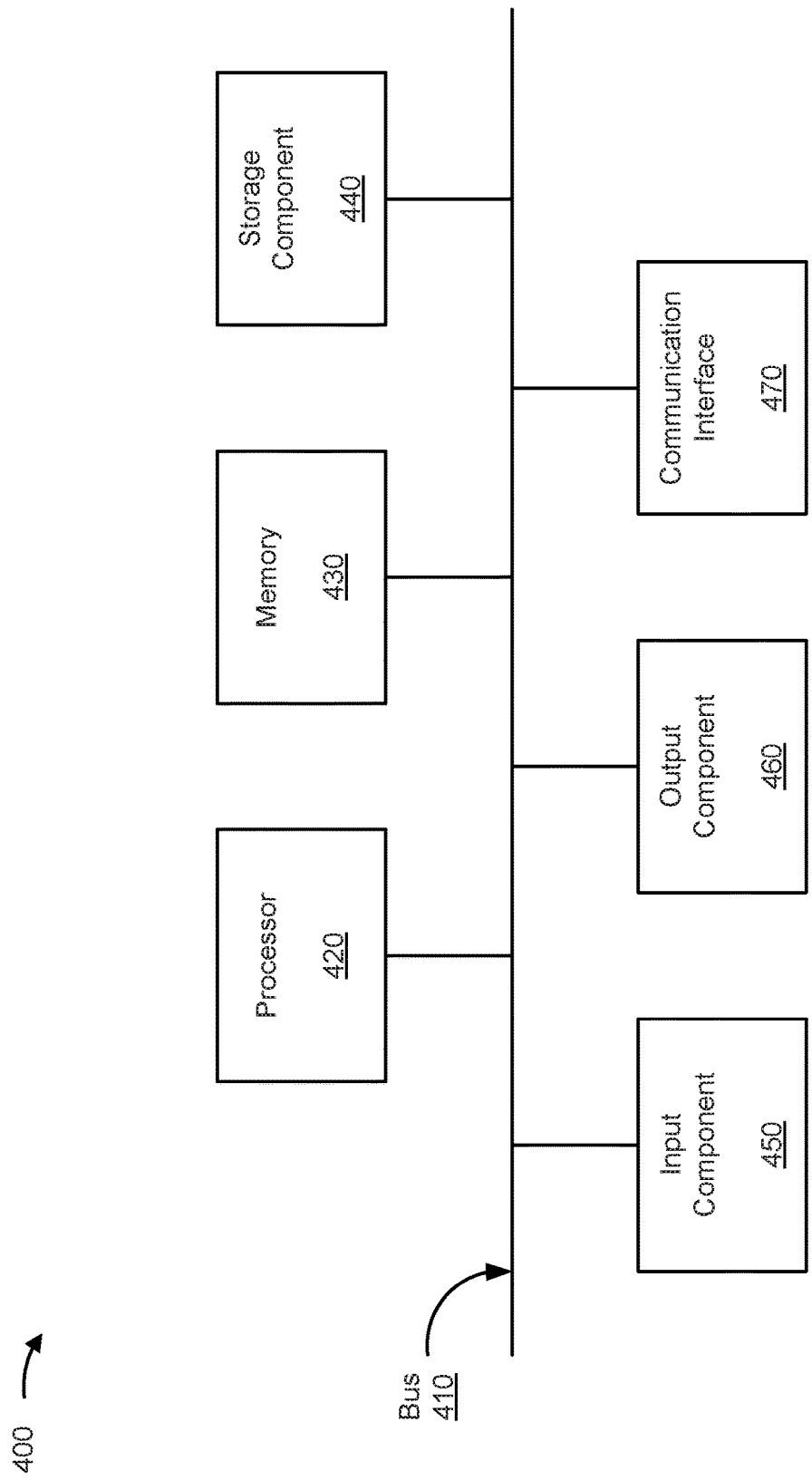
FIG. 4 is a diagram of example components of one or more devices of FIG. 3.

FIG. 4 is a diagram of example components of a device 400. Device 400 may correspond to user device 310, agent device 320, intelligent case management platform 330, and/or computing resource 335 of intelligent case management platform 330. In some implementations, user device 310, agent device 320, intelligent case management platform 330, and/or computing resource 335 of intelligent case management platform 330, may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 may include a random access memory (RAM), a read only memory (ROM), and/or another type of dynamic or static storage device (e.g., a flash memory, a magnetic memory, and/or an optical memory) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 may include a component that permits device 400 to receive information, such as via user input (e.g., a touch screen display, a user interface, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 may include a component that provides output information from device 400 (e.g., a display, a speaker, and/or one or more light-emitting diodes (LEDs)).

Communication interface 470 may include a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device may include memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
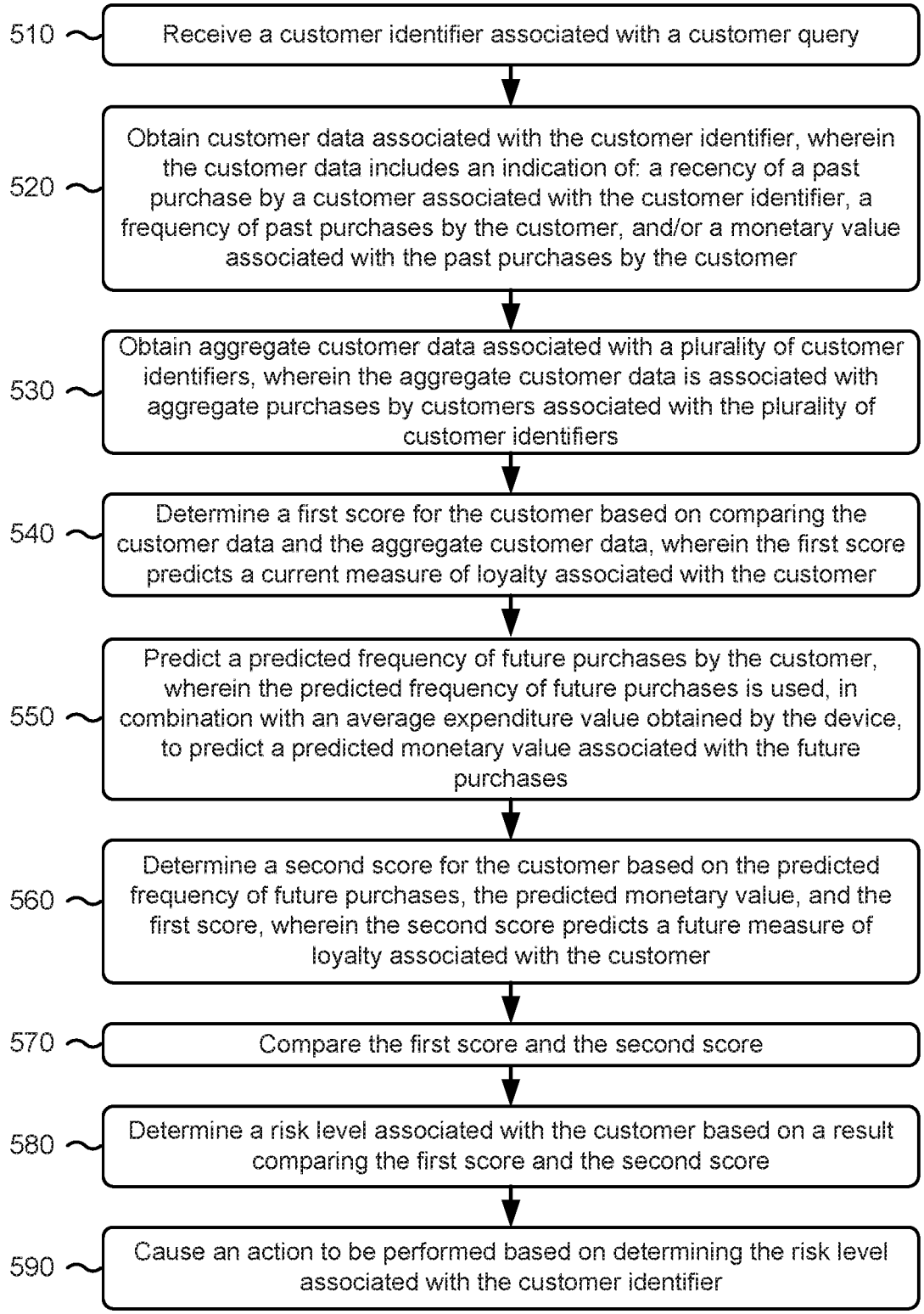
FIG. 5 is a flow chart of an example process for providing intelligent case management based on customer risk level.

FIG. 5 is a flow chart of an example process 500 for providing intelligent case management based on customer risk level. In some implementations, one or more process blocks of FIG. 5 may be performed by an intelligent case management platform (e.g., intelligent case management platform 330) and/or computing resource (e.g., computing resource 335) of intelligent case management platform. In some implementations, one or more process blocks of FIG. 5 may be performed by another device or a group of devices separate from or including the intelligent case management platform (e.g., intelligent case management platform 330), such as a user device (e.g., user device 310) and/or an agent device (e.g., agent device 320).

As shown in FIG. 5, process 500 may include receiving a customer identifier associated with a customer query (block 510). For example, the intelligent case management platform (e.g., using computing resource 335, processor 420, memory 430, storage component 440, input component 450, communication interface 470, and/or the like) may receive a customer identifier associated with a customer query, as described above in connection with FIGS. 1A-2E.

As further shown in FIG. 5, process 500 may include obtaining customer data associated with the customer identifier, wherein the customer data includes an indication of a recency of a past purchase by a customer associated with the customer identifier, a frequency of past purchases by the customer, and/or a monetary value associated with the past purchases by the customer (block 520). For example, the intelligent case management platform (e.g., using computing resource 335, processor 420, memory 430, storage component 440, input component 450, communication interface 470, and/or the like) may obtain customer data associated with the customer identifier, as described above in connection with FIGS. 1A-2E. In some implementations, the customer data may include an indication of a recency of a past purchase by a customer associated with the customer identifier, a frequency of past purchases by the customer, and/or a monetary value associated with the past purchases by the customer.

As further shown in FIG. 5, process 500 may include obtaining aggregate customer data associated with a plurality of customer identifiers, wherein the aggregate customer data is associated with aggregate purchases by customers associated with the plurality of customer identifiers (block 530). For example, the intelligent case management platform (e.g., using computing resource 335, processor 420, memory 430, storage component 440, input component 450, communication interface 470, and/or the like) may obtain aggregate customer data associated with a plurality of customer identifiers, as described above in connection with FIGS. 1A-2E. In some implementations, the aggregate customer data may be associated with aggregate purchases by customers associated with the plurality of customer identifiers.

As further shown in FIG. 5, process 500 may include determining a first score for the customer based on comparing the customer data and the aggregate customer data, wherein the first score predicts a current measure of loyalty associated with the customer (block 540). For example, the intelligent case management platform (e.g., using computing resource 335, processor 420, memory 430, storage component 440, and/or the like) may determine a first score for the customer based on comparing the customer data and the aggregate customer data, as described above in connection with FIGS. 1A-2E. In some implementations, the first score may predict a current measure of loyalty associated with the customer As further shown in FIG. 5, process 500 may include predicting, using a first model (e.g., a Pareto-NBD(BTYD) model), a predicted frequency of future purchases by the customer, wherein the predicted frequency of future purchases is used, in combination with an average expenditure value obtained by the device, to predict a predicted monetary value associated with the future purchases (block 550). For example, the intelligent case management platform (e.g., using computing resource 335, processor 420, memory 430, storage component 440, and/or the like) may predict, using a first model, a predicted frequency of future purchases by the customer, as described above in connection with FIGS. 1A-2E. In some implementations, the predicted frequency of future purchases is used, in combination with an average expenditure value obtained by the device, to predict a predicted monetary value associated with the future purchases. In some implementations, the first model is a Pareto-NBD(BTYD) model.

As further shown in FIG. 5, process 500 may include determining a second score for the customer based on the predicted frequency of future purchases, the predicted monetary value, and the first score, wherein the second score predicts a future measure of loyalty associated with the customer (block 560). For example, the intelligent case management platform (e.g., using computing resource 335, processor 420, memory 430, storage component 440, and/or the like) may determine a second score for the customer based on the predicted frequency of future purchases and the predicted monetary value, as described above in connection with FIGS. 1A-2E. In some implementations, the second score may predict a future measure of loyalty associated with the customer.

As further shown in FIG. 5, process 500 may include comparing the first score and the second score (block 570). For example, the intelligent case management platform (e.g., using computing resource 335, processor 420, memory 430, storage component 440, and/or the like) may compare the first score and the second score, as described above in connection with FIGS. 1A-2E.

As further shown in FIG. 5, process 500 may include determining a risk level associated with the customer based on a result of comparing the first score and the second score (block 580). For example, the intelligent case management platform (e.g., using computing resource 335, processor 420, memory 430, storage component 440, and/or the like) may determine a risk level associated with the customer based on a result of comparing the first score and the second score, as described above in connection with FIGS. 1A-2E.

As further shown in FIG. 5, process 500 may include causing an action to be performed based on determining the risk level associated with the customer identifier (block 590). For example, the intelligent case management platform (e.g., using computing resource 335, processor 420, memory 430, storage component 440, input component 450, output component 460, communication interface 470, and/or the like) may cause an action to be performed based on determining the risk level associated with the customer identifier, as described above in connection with FIGS. 1A-2E.

Process 500 may include additional implementations, such as any single implementation or any combination of implementations described below and/or in connection with one or more other processes described elsewhere herein.

In some implementations, the action may include obtaining a string of text associated with the customer query, determining, using a second model, a customer sentiment based on the string of text, where the customer sentiment includes a real-time indication of whether the customer is satisfied, dissatisfied, or neutral, and presenting the customer with an offer based on determining the customer sentiment. In some implementations, the offer may include an offer to upgrade an existing reservation, product, or service, may include an offer to discount an existing reservation, product, or service, or may include an offer for a gift.

In some implementations, the action may include obtaining item identifiers associated with items included in the past purchases by the customer, obtaining offer data associated with multiple offers available to the customer, determining, using a second model, scores for the multiple offers based on the item identifiers and the offer data, where the scores predict a measure of relevancy of the multiple offers to the customer, and transmitting, to an agent, a subset of the multiple offers to present to the customer based on the scores.

In some implementations, the intelligent case management platform may present, for visual display to an agent, a graphical representation of the risk level associated with the customer, and may automatically prompt the agent to perform the action based on the graphical representation of the risk level, where the action may include offering the customer an upgrade, offering the customer a discount, offering the customer an add-on, or sending the customer promotion material.

In some implementations, the intelligent case management platform may obtain agent data associated with a plurality of agents available to assist in resolving the customer query, may determine, using a second model, a plurality of second scores associated with the plurality of agents based on the first score and the agent data, where the plurality of second scores predict levels of confidence that agents, in the plurality of agents, have abilities to resolve customer queries associated with a threshold level of priority, and may assign, in real-time, an agent to respond to the customer query based on determining the plurality of third scores.

In some implementations, the intelligent case management platform may monitor strings of text exchanged between a customer and the agent, may predict, in real-time, a real-time customer sentiment based on the strings of text, and may automatically reassign the customer query to a different agent when the real-time customer sentiment satisfies a threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
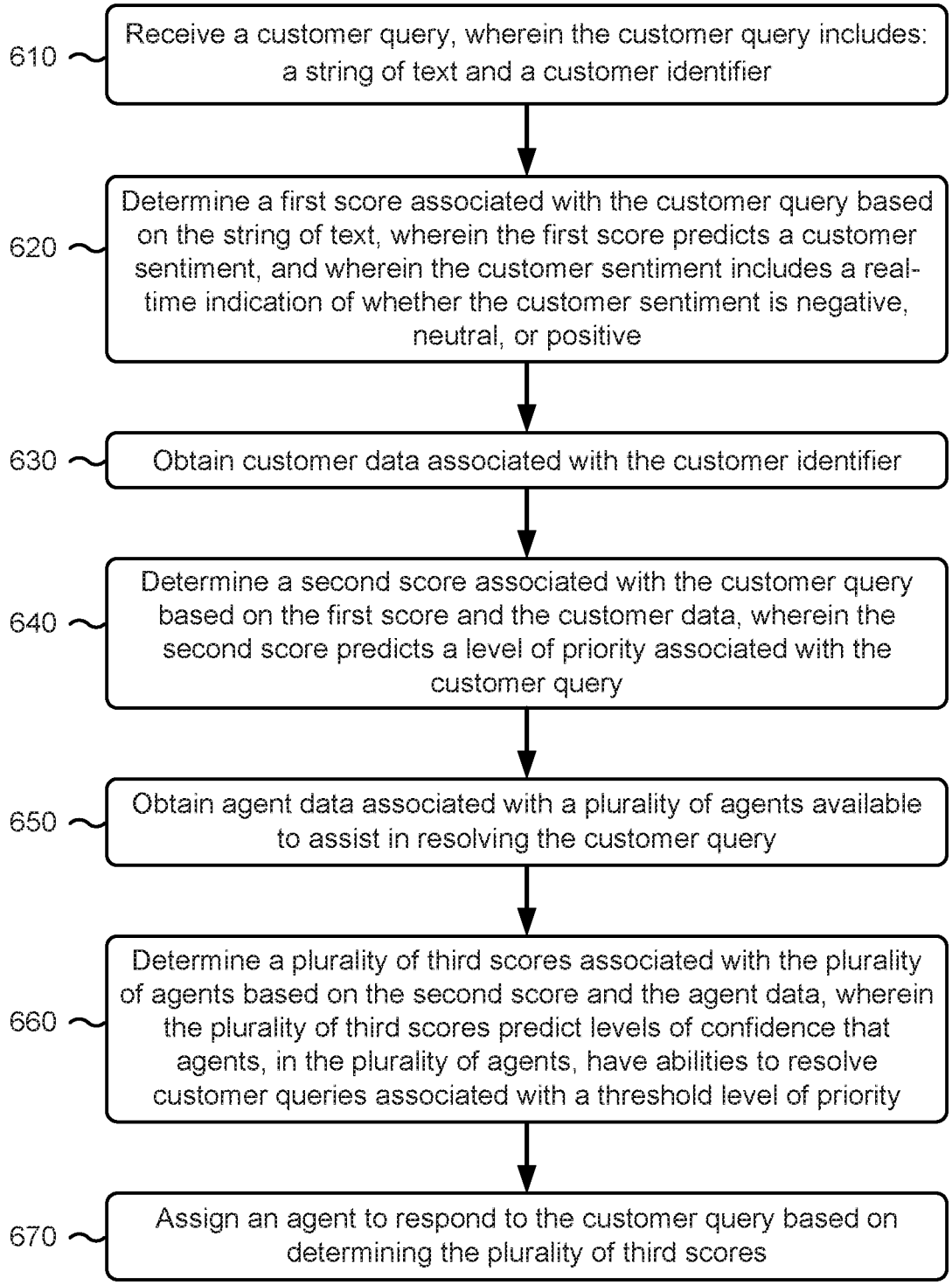
FIG. 6 is a flow chart of an example process for providing intelligent case management based on agent assignment.

FIG. 6 is a flow chart of an example process 600 for providing intelligent case management based on agent assignment. In some implementations, one or more process blocks of FIG. 6 may be performed by intelligent case management platform (e.g., intelligent case management platform 330) and/or a computing resource (e.g., computing resource 335) of the intelligent case management platform. In some implementations, one or more process blocks of FIG. 6 may be performed by another device or a group of devices separate from or including the intelligent case management platform (e.g., intelligent case management platform 330), such as a user device (e.g., user device 310) and/or an agent device (e.g., agent device 320).

As shown in FIG. 6, process 600 may include receiving a customer query, wherein the customer query includes a string of text and a customer identifier (block 610). For example, the intelligent case management platform (e.g., using computing resource 335, processor 420, memory 430, storage component 440, input component 450, communication interface 470, and/or the like) may receive a customer query, as described above in connection with FIGS. 1A-2E. In some implementations, the customer query may include a string of text, and a customer identifier.

As further shown in FIG. 6, process 600 may include determining, using a first model, a first score associated with the customer query based on the string of text, wherein the first score predicts a customer sentiment, and wherein the customer sentiment includes a real-time indication of whether the customer sentiment is negative, neutral, or positive (block 620). For example, the intelligent case management platform (e.g., using computing resource 335, processor 420, memory 430, storage component 440, and/or the like) may determine, using a first model, a first score associated with the customer query based on the string of text, as described above in connection with FIGS. 1A-2E. In some implementations, the first score may predict a customer sentiment, and the customer sentiment may include a real-time indication of whether the customer sentiment is negative, neutral, or positive.

As further shown in FIG. 6, process 600 may include obtaining customer data associated with the customer identifier (block 630). For example, the intelligent case management platform (e.g., using computing resource 335, processor 420, memory 430, storage component 440, input component 450, communication interface 470, and/or the like) may obtain customer data associated with the customer identifier, as described above in connection with FIGS. 1A-2E.

As further shown in FIG. 6, process 600 may include determining, using a second model, a second score associated with the customer query based on the first score and the customer data, wherein the second score predicts a level of priority associated with the customer query (block 640). For example, the intelligent case management platform (e.g., using computing resource 335, processor 420, memory 430, storage component 440, and/or the like) may determine, using a second model, a second score associated with the customer query based on the first score and the customer data, as described above in connection with FIGS. 1A-2E. In some implementations, the second score may predict a level of priority associated with the customer query.

As further shown in FIG. 6, process 600 may include obtaining agent data associated with a plurality of agents available to assist in resolving the customer query (block 650). For example, the intelligent case management platform (e.g., using computing resource 335, processor 420, memory 430, storage component 440, input component 450, communication interface 470, and/or the like) may obtain agent data associated with a plurality of agents available to assist in resolving the customer query, as described above in connection with FIGS. 1A-2E.

As further shown in FIG. 6, process 600 may include determining, using a third model, a plurality of third scores associated with the plurality of agents based on the second score and the agent data, wherein the plurality of third scores predict levels of confidence that agents, in the plurality of agents, have abilities to resolve customer queries associated with a threshold level of priority (block 660). For example, the intelligent case management platform (e.g., using computing resource 335, processor 420, memory 430, storage component 440, and/or the like) may determine, using a third model, a plurality of third scores associated with the plurality of agents based on the second score and the agent data, as described above in connection with FIGS. 1A-2E. In some implementations, the plurality of third scores may predict levels of confidence that agents, in the plurality of agents, have abilities to resolve customer queries associated with a threshold level of priority.

As further shown in FIG. 6, process 600 may include assigning, in real time, an agent to respond to the customer query based on determining the plurality of third scores (block 670). For example, the intelligent case management platform (e.g., using computing resource 335, processor 420, memory 430, storage component 440, input component 450, output component 460, communication interface 470, and/or the like) may assign, in real-time, an agent to respond to the customer query based on determining the plurality of third scores, as described above in connection with FIGS. 1A-2E.

Process 600 may include additional implementations, such as any single implementation or any combination of implementations described below and/or in connection with one or more other processes described elsewhere herein.

In some implementations, the customer data may include an indication of a customer tier level, a customer loyalty level, or a customer risk level. In some implementations, the agent data may include an indication of a rating associated with resolving past customer queries, or a number of past customer queries involving an agent.

In some implementations, the intelligent case management platform may obtain data associated with past purchases by a customer associated with the customer identifier, may obtain item identifiers associated with items included in the past purchases, may obtain offer data associated with a plurality of offers, may determine, using a fourth model, a plurality of fourth scores associated with the plurality of offers based on the item identifiers and the offer data, where the plurality of fourth scores predict a measure of relevancy of offers in the plurality of offers, to the customer, and may transmit, to the agent, a subset of the plurality of offers to present to the customer based on the plurality of fourth scores.

In some implementations, the intelligent case management platform may assign the customer query to a query category based on a customer query attribute, may determine, using a fourth model, a plurality of fourth scores associated with the plurality of agents based on the agent data and the query category, where the plurality of fourth scores predict levels of confidence that the agents, in the plurality of agents, have abilities to resolve customer queries associated with the query category, may compare the plurality of third scores and the plurality of fourth scores, and may assign, in real-time, the agent to respond to the customer query, based on a result of comparing the plurality of third scores and the plurality of fourth scores.

In some implementations, the query category may include a cancellation request, a modification request, a grievance request, a feedback request, or a customer data update request. In some implementations, the intelligent case management platform may monitor strings of text exchanged between a customer and the agent, may predict, in real-time, a real-time customer sentiment based on the strings of text, and may automatically reassign the customer query to a different agent when the real-time customer sentiment satisfies a threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
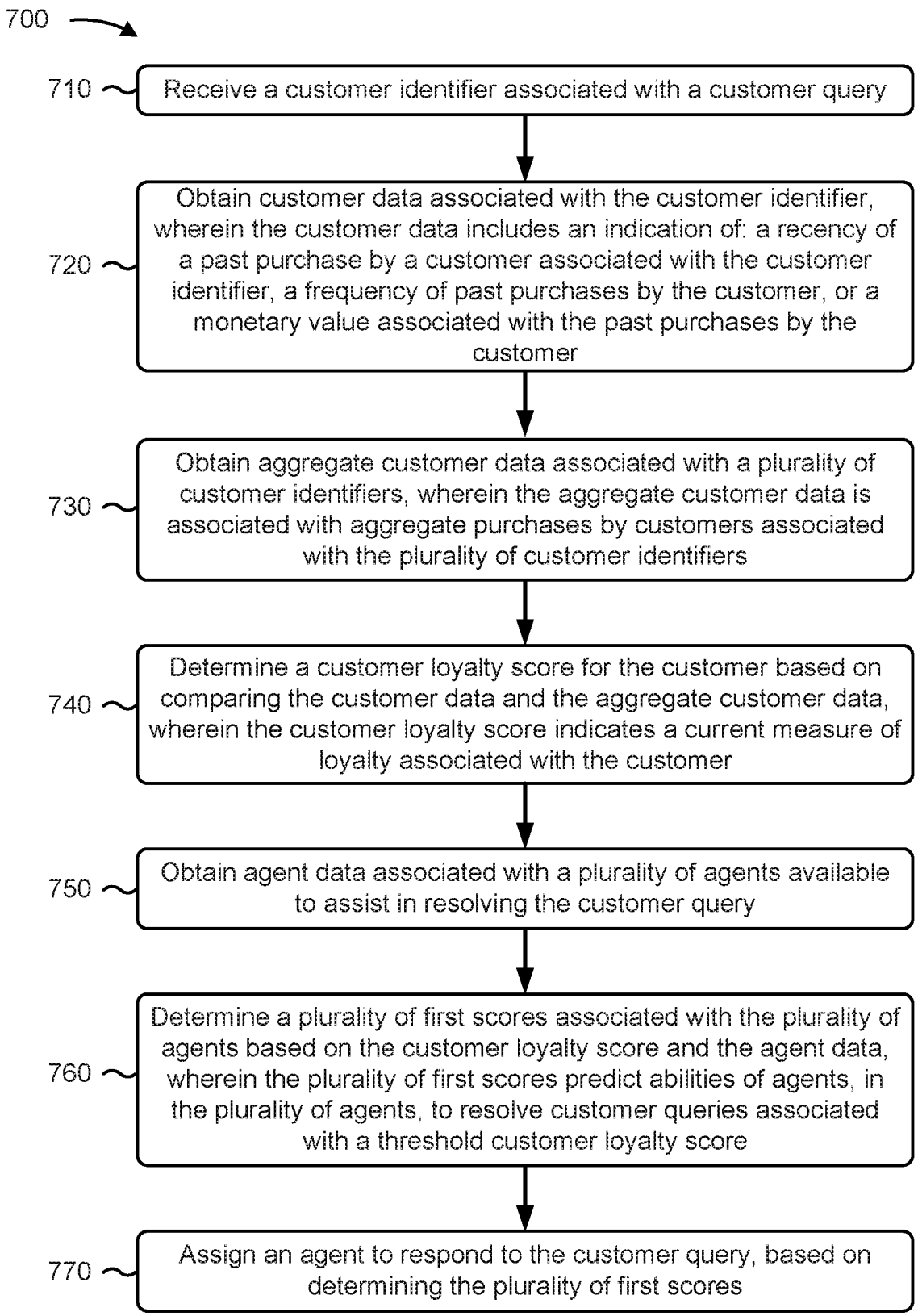
FIG. 7 is a flow chart of an example process for providing intelligent case management based on agent assignment.

FIG. 7 is a flow chart of an example process 700 for providing intelligent case management based on agent assignment. In some implementations, one or more process blocks of FIG. 7 may be performed by intelligent case management platform (e.g., intelligent case management platform 330) and/or a computing resource (e.g., computing resource 335) of the intelligent case management platform. In some implementations, one or more process blocks of FIG. 7 may be performed by another device or a group of devices separate from or including the intelligent case management platform (e.g., intelligent case management platform 330), such as a user device (e.g., user device 310) and/or an agent device (e.g., agent device 320).

As shown in FIG. 7, process 700 may include receiving a customer identifier associated with a customer query (block 710). For example, the intelligent case management platform (e.g., using computing resource 335, processor 420, memory 430, storage component 440, input component 450, communication interface 470, and/or the like) may receive a customer identifier associated with a customer query, as described above in connection with FIGS. 1A-2E.

As further shown in FIG. 7, process 700 may include obtaining customer data associated with the customer identifier, wherein the customer data includes an indication of a recency of a past purchase by a customer associated with the customer identifier, a frequency of past purchases by the customer, or a monetary value associated with the past purchases by the customer (block 720). For example, the intelligent case management platform (e.g., using computing resource 335, processor 420, memory 430, storage component 440, input component 450, communication interface 470, and/or the like) may obtain customer data associated with the customer identifier, as described above in connection with FIGS. 1A-2E. In some implementations, the customer data may include an indication of a recency of a past purchase by a customer associated with the customer identifier, a frequency of past purchases by the customer, or a monetary value associated with the past purchases by the customer.

As further shown in FIG. 7, process 700 may include obtaining aggregate customer data associated with a plurality of customer identifiers, wherein the aggregate customer data is associated with aggregate purchases by customers associated with the plurality of customer identifiers (block 730). For example, the intelligent case management platform (e.g., using computing resource 335, processor 420, memory 430, storage component 440, input component 450, communication interface 470, and/or the like) may obtain aggregate customer data associated with a plurality of customer identifiers, as described above in connection with FIGS. 1A-2E. In some implementations, the aggregate customer data may be associated with aggregate purchases by customers associated with the plurality of customer identifiers.

As further shown in FIG. 7, process 700 may include determining a customer loyalty score for the customer based on comparing the customer data and the aggregate customer data, wherein the customer loyalty score indicates a current measure of loyalty associated with the customer (block 740). For example, the intelligent case management platform (e.g., using computing resource 335, processor 420, memory 430, storage component 440, and/or the like) may determine a customer loyalty score for the customer based on comparing the customer data and the aggregate customer data, as described above in connection with FIGS. 1A-2E. In some implementations, the customer loyalty score may indicate a current measure of loyalty associated with the customer.

As further shown in FIG. 7, process 700 may include obtaining agent data associated with a plurality of agents available to assist in resolving the customer query (block 750). For example, the intelligent case management platform (e.g., using computing resource 335, processor 420, memory 430, storage component 440, input component 450, communication interface 470, and/or the like) may obtain agent data associated with a plurality of agents available to assist in resolving the customer query, as described above in connection with FIGS. 1A-2E.

As further shown in FIG. 7, process 700 may include determining, using a first model, a plurality of first scores associated with the plurality of agents based on the customer loyalty score and the agent data, wherein the plurality of first scores predict abilities of agents, in the plurality of agents, to resolve customer queries associated with a threshold customer loyalty score (block 760). For example, the intelligent case management platform (e.g., using computing resource 335, processor 420, memory 430, storage component 440, and/or the like) may determine, using a first model, a plurality of first scores associated with the plurality of agents based on the customer loyalty score and the agent data, as described above in connection with FIGS. 1A-2E. In some implementations, the plurality of first scores may predict abilities of agents, in the plurality of agents, to resolve customer queries associated with a threshold customer loyalty score.

As further shown in FIG. 7, process 700 may include assigning, in real time, an agent to respond to the customer query, based on determining the plurality of first scores (block 770). For example, the intelligent case management platform (e.g., using computing resource 335, processor 420, memory 430, storage component 440, input component 450, output component 460, communication interface 470, and/or the like) may assign, in real-time, an agent to respond to the customer query, based on determining the plurality of first scores, as described above in connection with FIGS. 1A-2E.

Process 700 may include additional implementations, such as any single implementation or any combination of implementations described below and/or in connection with one or more other processes described elsewhere herein.

In some implementations, the agent data may include an indication of a rating associated with resolving past customer queries, or a number of past customer queries involving an agent. In some implementations, the intelligent case management platform may obtain item identifiers associated with items included in the past purchases, may obtain offer data associated with a plurality of offers, may determine, using a second model, a plurality of second scores associated with the plurality of offers based on the item identifiers and the offer data, where the plurality of second scores predict measures of relevancy of offers, in the plurality of offers, to the customer, and may transmit, to the agent, a subset of the plurality of offers to present to the customer based on the plurality of second scores.

In some implementations, the subset of the plurality of offers may include an offer to upgrade an existing reservation, product, or service, an offer to discount an existing reservation, product, or service, or an offer for a gift. In some implementations, the intelligent case management platform may monitor strings of text exchanged between a customer and the agent, may predict, in real-time, a real-time customer sentiment based on monitoring the strings of text, and may automatically reassign the customer query to a different agent when the real-time customer sentiment satisfies a threshold.

In some implementations, the intelligent case management platform may present, for visual display, a graphical representation including an indication of the customer loyalty score associated with the customer, and may automatically prompt the agent to perform an action based on the graphical representation of the customer loyalty score, where the action includes offering the customer an upgrade, offering the customer a discount, offering the customer an add-on, or sending the customer promotion material.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations, described herein, provide an intelligent case management platform 330, by which customer data may be intelligently analyzed for use in predicting whether a customer is at risk of leaving a business. In this way, the customer may be intelligently matched with an agent (e.g., a customer service agent) that may be more adept at solving the customer query, and better equipped, based on past experiences, to positively resolve the customer query posed by the customer. Moreover, the customer data may be intelligently analyzed to predict future spending patterns, by which an agent may gain insight into the customer's preferences and/or behaviors to provide more precisely targeted offers and promotions, which further improves customer retention. In this way, the management of cases may be more automated, efficient, and consistent, thereby conserving network resources (e.g., signaling resources, communication interfaces, bandwidth, and/or the like) that would otherwise be needed to randomly distribute cases to hundreds or thousands of agents.

Furthermore, implementations described herein implement rigorous, computerized processes to perform automation of case resolution, automation of case creation, automation of agent assignment, and/or automation of targeted offer generation to perform aspects of case management that were not previously performed or were previously performed using subjective human intuition or input. In this way, automating aspects of performing intelligent case management conserves computing resources (e.g., processor resources, memory resources, and/or the like) that would otherwise be wasted in attempting to manually and inefficiently complete tasks that are automatable.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a customer query,
      wherein the customer query includes a customer identifier;
   obtaining, by the device and using the customer identifier, customer data associated a customer,
      wherein the customer data includes an indication of one or more of:
         a recency of a past purchase by the customer associated with the customer identifier,
         a frequency of past purchases by the customer, or
         a monetary value associated with the past purchases by the customer;
   obtaining, by the device, aggregate customer data associated with a plurality of customer identifiers,
      wherein the aggregate customer data is associated with aggregate purchases by customers associated with the plurality of customer identifiers;
   determining, by the device, a first score for the customer based on comparing the customer data and the aggregate customer data,
      wherein the first score predicts a current measure of loyalty associated with the customer;
   predicting, by the device and using a first model, a predicted frequency of future purchases by the customer,
      wherein the predicted frequency of future purchases is used, in combination with an average expenditure value obtained by the device, to predict a predicted monetary value associated with the future purchases;
   determining, by the device, a second score for the customer based on the predicted frequency of future purchases, the predicted monetary value, and the first score,
      wherein the second score predicts a future measure of loyalty associated with the customer;
   comparing, by the device, the first score and the second score;
   determining, by the device, a risk level associated with the customer based on a result of comparing the first score and the second score;
   causing, by the device, an action to be performed based on determining the risk level associated with the customer,
      wherein the action comprises:
         automatically causing a change in a configuration of another device associated with the customer,
            the change in the configuration including one or more of:
               increasing or decreasing a quantity of services provided, or
               increasing or decreasing network bandwidth,
         obtaining a string of text associated with the customer query,
         determining, using a second model, a customer sentiment based on the string of text,
            wherein the second model:
               inputs the string of text during communication with a chatbot,
               classifies the string of text as being positive, negative, or neutral, and
               outputs a customer's sentiment score using a natural language processing technique indicative of the customer's sentiment based on classifying the string of text, and
            wherein the customer sentiment includes a real-time indication of whether the customer is feeling positive, negative, or neutral during interaction with the device by the chatbot, and
         presenting the customer with an offer based on determining the customer sentiment; and
   assigning, in real-time, an agent to respond to the customer query.

2. The method of claim 1, wherein the offer includes: an offer to upgrade an existing reservation, product, or service, or
   an offer to discount an existing reservation, product, or service.

3. The method of claim 1, wherein the action further comprises:
   obtaining item identifiers associated with items included in the past purchases by the customer;
   obtaining offer data associated with multiple offers available to the customer;
   determining, using a third model, scores for the multiple offers based on the item identifiers and the offer data,
      wherein the scores predict a measure of relevancy of the multiple offers to the customer; and
   transmitting, to the agent, a subset of the multiple offers to present to the customer based on the scores.

4. The method of claim 1, further comprising:
   presenting, for visual display to the agent, a graphical representation of the risk level associated with the customer; and
   automatically prompting the agent to perform another action based on the graphical representation of the risk level,
      wherein the other action includes:
         offering the customer an upgrade,
         offering the customer a discount,
         offering the customer an add-on, or
         sending promotion material to the customer.

5. The method of claim 1, further comprising:
obtaining agent data associated with a plurality of agents available to assist in resolving the customer query;
determining, using a third model, a plurality of second scores associated with the plurality of agents based on the first score and the agent data,
wherein the plurality of second scores predict levels of confidence that agents, in the plurality of agents, have abilities to resolve customer queries associated with a threshold level of priority; and
where assigning, in real-time, the agent to respond to the customer query comprises:
assigning, in real-time, the agent to respond to the customer query based on determining the plurality of second scores.

6. The method of claim 5, further comprising:
monitoring strings of text exchanged between the customer and the agent;
predicting, in real-time, a real-time customer sentiment based on the strings of text; and
automatically reassigning the customer query to a different agent when the real-time customer sentiment satisfies a threshold.

7. The method of claim 1, wherein the offer includes:
accessing an inventory system to send a gift to the customer.

8. A non-transitory computer-readable medium storing instructions, the instructions comprising:
one or more instructions that, when executed by one or more processors of a device, cause the one or more processors to:
receive a customer query,
wherein the customer query is associated with a customer identifier;
create a case having a case identifier;
assign the case identifier associated with the customer query;
obtain, using the customer identifier, customer data associated with a customer,
wherein the customer data includes an indication of:
a recency of a past purchase by the customer associated with the customer identifier,
a frequency of past purchases by the customer, or
a monetary value associated with the past purchases by the customer;
obtain aggregate customer data associated with a plurality of customer identifiers,
wherein the aggregate customer data is associated with aggregate purchases by customers associated with the plurality of customer identifiers;
determine a customer loyalty score for the customer based on comparing the customer data and the aggregate customer data,
wherein the customer loyalty score indicates a current measure of loyalty associated with the customer;
determine a risk level associated with the customer based on the customer loyalty score;
cause an action to be performed based on determining the risk level associated with the customer,
wherein the action comprises:
automatically causing a change in a configuration of another device,
the change in the configuration including one or more of:
increasing or decreasing a quantity of services provided, or
increasing or decreasing network bandwidth,
obtaining a string of text associated with the customer query,
determining, using a first model, a customer sentiment based on the string of text,
wherein the first model:
inputs the string of text during communication with a chatbot,
classifies the string of text as being positive, negative, or neutral, and
outputs a customer's sentiment score using a natural language processing technique indicative of the customer's sentiment based on classifying the string of text, and
wherein the customer sentiment includes a real-time indication of whether the customer is feeling positive, negative, or neutral during interaction with the device by the chatbot, and
presenting the customer with an offer based on determining the customer sentiment;
obtain agent data associated with a plurality of agents available to assist in resolving the customer query associated with the case identifier;
determine, using a second model, a plurality of first scores associated with the plurality of agents based on the customer loyalty score and the agent data,
wherein the plurality of first scores predict abilities of agents, in the plurality of agents, to resolve customer queries; and
assign, in real-time, an agent to respond to the customer query, based on determining the plurality of first scores.

9. The non-transitory computer-readable medium of claim 8, wherein the agent data includes an indication of:
a rating associated with resolving past customer queries, or
a number of past customer queries involving the agent.

10. The non-transitory computer-readable medium of claim 8, wherein the one or more instructions, when executed by the one or more processors, further cause the one or more processors to:
obtain item identifiers associated with items included in the past purchases;
obtain offer data associated with a plurality of offers;
determine, using a third model, a plurality of second scores associated with the plurality of offers based on the item identifiers and the offer data,
wherein the plurality of second scores predict measures of relevancy of offers, in the plurality of offers, to the customer; and
transmit, to the agent, a subset of the plurality of offers to present to the customer based on the plurality of second scores.

11. The non-transitory computer-readable medium of claim 10, wherein the subset of the plurality of offers includes:
an offer to upgrade an existing reservation, product, or service,
an offer to discount an existing reservation, product, or service, or
an offer for a gift.

12. The non-transitory computer-readable medium of claim 8, wherein the one or more instructions, when executed by the one or more processors, further cause the one or more processors to:
monitor strings of text exchanged between the customer and the agent;

predict, in real-time, a real-time customer sentiment based on monitoring the strings of text; and
automatically reassign the customer query to a different agent when the real-time customer sentiment satisfies a threshold.

13. The non-transitory computer-readable medium of claim 8, wherein the one or more instructions, when executed by the one or more processors, further cause the one or more processors to:
present, for visual display, a graphical representation including an indication of the customer loyalty score associated with the customer; and
automatically prompt the agent to perform another action based on the graphical representation of the customer loyalty score,
wherein the other action includes:
offering the customer an upgrade,
offering the customer a discount,
offering the customer an add-on, or
sending promotion material to the customer.

14. A device, comprising:
one or more memories; and
one or more processors, communicatively coupled to the one or more memories, to:
receive a customer query,
wherein the customer query is associated with a customer identifier;
create a case having a case identifier;
assign the case identifier associated with the customer query;
obtain, using the customer identifier, customer data associated with a customer,
wherein the customer data includes an indication of:
a recency of a past purchase by the customer associated with the customer identifier,
a frequency of past purchases by the customer, or
a monetary value associated with the past purchases by the customer;
obtain aggregate customer data associated with a plurality of customer identifiers,
wherein the aggregate customer data is associated with aggregate purchases by customers associated with the plurality of customer identifiers;
determine a customer loyalty score for the customer based on comparing the customer data and the aggregate customer data,
wherein the customer loyalty score indicates a current measure of loyalty associated with the customer;
determine a risk level associated with the customer based on the customer loyalty score;
cause an action to be performed based on determining the risk level associated with the customer,
wherein the action comprises:
automatically causing a change in a configuration of another device,
the change in the configuration including one or more of:
increasing or decreasing a quantity of services provided, or
increasing or decreasing network bandwidth,
obtaining a string of text associated with the customer query,
determining, using a first model, a customer sentiment based on the string of text,
wherein the first model:
inputs the string of text during communication with a chatbot,
classifies the string of text as being positive, negative, or neutral, and
outputs a customer's sentiment score using a natural language processing technique indicative of the customer's sentiment based on classifying the string of text, and
wherein the customer sentiment includes a real-time indication of whether the customer is feeling positive, negative, or neutral during interaction with the device by the chatbot, and
presenting the customer with an offer based on determining the customer sentiment;
obtain agent data associated with a plurality of agents available to assist in resolving the customer query associated with the case identifier;
determine, using a second model, a plurality of first scores associated with the plurality of agents based on the customer loyalty score and the agent data,
wherein the plurality of first scores predict abilities of agents, in the plurality of agents, to resolve customer queries; and
assign, in real-time, an agent to respond to the customer query, based on determining the plurality of first scores.

15. The device of claim 14, wherein the customer data includes an indication of:
a customer tier level,
a customer loyalty level, or
the risk level.

16. The device of claim 14, wherein the agent data includes an indication of:
a rating associated with resolving past customer queries, or
a number of past customer queries involving the agent.

17. The device of claim 14, wherein the one or more processors are further to:
monitor strings of text exchanged between the customer and the agent;
predict, in real-time, a real-time customer sentiment based on monitoring the strings of text; and
automatically reassign the customer query to a different agent when the real-time customer sentiment satisfies a threshold.

18. The device of claim 14, wherein the one or more processors are further to:
obtain item identifiers associated with items included in the past purchases;
obtain offer data associated with a plurality of offers;
determine, using a third model, a plurality of second scores associated with the plurality of offers based on the item identifiers and the offer data,
wherein the plurality of second scores predict measures of relevancy of offers, in the plurality of offers, to the customer; and
transmit, to the agent, a subset of the plurality of offers to present to the customer based on the plurality of second scores.

19. The device of claim 14, wherein the one or more processors are further to:
present, for visual display, a graphical representation including an indication of the customer loyalty score associated with the customer; and
automatically prompt the agent to perform another action based on the graphical representation of the customer loyalty score, wherein the other action includes:
offering the customer an upgrade,
offering the customer a discount,
offering the customer an add-on, or
sending promotion material to the customer.

\* \* \* \* \*